United States Patent

(12) United States Patent
Kilian et al.

(10) Patent No.: US 12,166,583 B2
(45) Date of Patent: Dec. 10, 2024

(54) CONCEALMENT OF ENVIRONMENTAL INFLUENCES ON THE TRANSMITTING PARAMETERS

(71) Applicants: Fraunhofer-Gesellschaft zur Foerderung der angewandten Forschung e.V., Munich (DE); Diehl Metering GmbH, Ansbach (DE)

(72) Inventors: Gerd Kilian, Erlangen (DE); Josef Bernhard, Erlangen (DE); Thomas Kauppert, Nuremberg (DE); Hristo Petkov, Nuremberg (DE); Johannes Wechsler, Erlangen (DE); Jakob Kneissl, Erlangen (DE); Raphael Mzyk, Kammerstein (DE); Klaus Gottschalk, Winkelhaid (DE); Dominik Soller, Erlangen (DE); Michael Schlicht, Erlangen (DE)

(73) Assignees: Fraunhofer-Gesellschaft zur Foerderung der angewandten Forschung e.V., Munich (DE); Diehl Metering GmbH, Ansbach (DE)

( * ) Notice: Subject to any disclaimer, the term of this patent is extended or adjusted under 35 U.S.C. 154(b) by 0 days.

(21) Appl. No.: 16/691,135

(22) Filed: Nov. 21, 2019

(65) Prior Publication Data

US 2020/0169349 A1 May 28, 2020

(30) Foreign Application Priority Data

Nov. 23, 2018 (DE) ...................... 10 2018 220 204.4

(51) Int. Cl.
*H04L 1/00* (2006.01)
*H04L 7/033* (2006.01)
(Continued)

(52) U.S. Cl.
CPC ............ *H04L 1/009* (2013.01); *H04L 7/0331* (2013.01); *H04L 27/2082* (2013.01); *H04W 12/03* (2021.01)

(58) Field of Classification Search
None
See application file for complete search history.

(56) References Cited

U.S. PATENT DOCUMENTS 5,721,783 A * 2/1998 Anderson ......... H04M 1/72421
381/328
5,794,126 A * 8/1998 Tsutsumi ............... H04B 13/02
219/210

(Continued)

FOREIGN PATENT DOCUMENTS

CN 1191060 A * 8/1998 ............. H04B 1/385
CN 1349693 A 5/2002
(Continued)

OTHER PUBLICATIONS

"Oscillation Circuit Design Overview", https://www.sii.co.jp/en/quartz/circuit-design/.

(Continued)

*Primary Examiner* — Berhanu Tadese
(74) *Attorney, Agent, or Firm* — Perkins Coie LLP; Michael A. Glenn

(57) ABSTRACT

The innovation relates to technologies by which the signal characteristics and, hence, environmental conditions of a transmitter can be concealed. In one aspect, a data transmitter comprises a transmitter and a changer, wherein the transmitter is configured to transmit a signal, wherein at least one signal parameter of the signal depends on at least one environmental parameter in an environment of the data transmitter, wherein the changer is configured to change the at least one signal parameter of the signal or a parameter on (Continued)

which the at least one signal parameter of the signal depends, in order to conceal the at least one environmental parameter.

51 Claims, 9 Drawing Sheets

(51) Int. Cl.
*H04L 27/20* (2006.01)
*H04W 12/03* (2021.01)

(56) References Cited

U.S. PATENT DOCUMENTS

| | | | | |
|---|---|---|---|---|
| 5,850,598 A * | 12/1998 | Behrent | H04B 1/30 | 455/324 |
| 6,034,633 A * | 3/2000 | Cassen | H01Q 21/0025 | 342/372 |
| 6,137,846 A * | 10/2000 | Kawai | H03J 7/22 | 331/4 |
| 7,068,985 B2 * | 6/2006 | Quilisch | H03G 3/3047 | 330/289 |
| 7,392,150 B2 * | 6/2008 | Kuepper | G01D 9/007 | 236/1 C |
| 7,711,273 B2 * | 5/2010 | Koc | H04B 10/65 | 398/208 |
| 7,764,133 B1 * | 7/2010 | Nicholls | H03L 1/04 | 331/44 |
| 8,767,868 B2 * | 7/2014 | Friedrich | H04L 25/03 | 375/296 |
| 8,934,574 B2 * | 1/2015 | Friedrich | H04L 25/06 | 375/297 |
| 9,202,093 B2 * | 12/2015 | Nummila | G06K 7/10366 | |
| 9,729,366 B2 * | 8/2017 | Wichlund | H04L 27/2334 | |
| 9,883,801 B2 * | 2/2018 | Stump | A61B 5/11 | |
| 10,775,222 B2 * | 9/2020 | Ploss | G01F 1/667 | |
| 11,456,808 B2 * | 9/2022 | Kilian | H04W 4/38 | |
| 2001/0053176 A1 * | 12/2001 | Fry | H04B 1/7136 | 375/E1.034 |
| 2002/0105436 A1 * | 8/2002 | Bell | G01K 7/245 | 374/170 |
| 2004/0066853 A1 * | 4/2004 | Chen | H04N 19/895 | 375/240.27 |
| 2004/0077321 A1 * | 4/2004 | Burgess | H04B 1/40 | 455/130 |
| 2004/0235438 A1 * | 11/2004 | Quilisch | H04W 52/52 | 455/127.1 |
| 2007/0206963 A1 | 9/2007 | Koc | | |
| 2007/0211786 A1 * | 9/2007 | Shattil | H04J 13/00 | 375/141 |
| 2007/0222590 A1 * | 9/2007 | Posamentier | G01K 1/024 | 340/572.1 |
| 2008/0004062 A1 * | 1/2008 | Nibe | H04W 28/22 | 455/519 |
| 2009/0110033 A1 * | 4/2009 | Shattil | H04J 13/0077 | 375/141 |
| 2010/0029199 A1 * | 2/2010 | Chen | H01Q 1/247 | 455/14 |
| 2010/0067331 A1 * | 3/2010 | Yang | H04B 11/00 | 367/134 |
| 2010/0217556 A1 * | 8/2010 | Hohe | G01D 3/0365 | 702/104 |
| 2012/0176237 A1 * | 7/2012 | Tabe | A61B 5/6804 | 340/539.12 |
| 2012/0219088 A1 | 8/2012 | Friedrich et al. | | |
| 2013/0265139 A1 * | 10/2013 | Nummila | G06K 19/0723 | 340/10.1 |
| 2013/0301688 A1 * | 11/2013 | Khandani | H04B 7/026 | 375/211 |
| 2015/0280951 A1 * | 10/2015 | Shin | H04L 27/14 | 375/334 |
| 2016/0063286 A1 * | 3/2016 | Nikunen | G06K 19/0716 | 340/10.34 |
| 2016/0065306 A1 * | 3/2016 | Huang | H04W 4/70 | 398/118 |
| 2016/0209177 A1 * | 7/2016 | Kirkpatrick | G06T 3/4038 | |
| 2017/0357303 A1 * | 12/2017 | Kopetz | H04J 3/0638 | |
| 2018/0199814 A1 * | 7/2018 | Stump | A61B 5/318 | |
| 2018/0227002 A1 * | 8/2018 | Blaauw | H03B 5/1228 | |
| 2018/0262526 A1 * | 9/2018 | Jain | G09C 1/00 | |
| 2020/0168987 A1 * | 5/2020 | Kilian | H03L 1/00 | |
| 2020/0169349 A1 * | 5/2020 | Kilian | H04W 12/03 | |
| 2020/0213964 A1 * | 7/2020 | Petkov | H04W 24/02 | |

FOREIGN PATENT DOCUMENTS

| | | | | |
|---|---|---|---|---|
| CN | 1108728 C | * | 5/2003 | H04B 1/385 |
| CN | 102035583 A | | 4/2011 | |
| CN | 102710269 A | | 10/2012 | |
| CN | 202814558 U | * | 3/2013 | |
| CN | 103902811 A | * | 7/2014 | |
| CN | 203691536 U | * | 7/2014 | |
| CN | 105103568 A | | 11/2015 | |
| CN | 105191759 A | * | 12/2015 | |
| CN | 205071823 U | * | 3/2016 | |
| CN | 105637975 A | * | 6/2016 | H04B 10/116 |
| CN | 105684373 A | * | 6/2016 | H04L 27/2334 |
| CN | 105827551 A | * | 8/2016 | |
| CN | 106533468 A | * | 3/2017 | |
| CN | 106546901 A | * | 3/2017 | |
| CN | 106716270 A | * | 5/2017 | F24F 11/30 |
| CN | 106717117 A | * | 5/2017 | F24F 11/30 |
| CN | 106922183 A | * | 7/2017 | F24F 11/30 |
| CN | 207351544 U | * | 5/2018 | |
| CN | 108317996 A | * | 7/2018 | G01C 21/20 |
| CN | 109217911 A | * | 1/2019 | H04B 17/309 |
| CN | 110073301 A | * | 7/2019 | A01B 3/02 |
| CN | 109217911 B | * | 2/2021 | H04B 17/309 |
| CN | 111224682 B | * | 8/2022 | H04B 1/0475 |
| DE | 19909921 A1 | * | 9/2000 | H04B 17/382 |
| DE | 69637454 T2 | * | 3/2009 | H04B 1/385 |
| DE | 102011004752 A1 | * | 8/2012 | H04L 25/03 |
| DE | 102013112993 A1 | * | 5/2015 | H04B 10/90 |
| DE | 102014200963 A1 | * | 7/2015 | B60K 35/00 |
| DE | 102014201801 A1 | * | 8/2015 | B60R 1/00 |
| DE | 102015004049 A1 | * | 9/2016 | G01F 1/662 |
| DE | 102016006978 A1 | * | 10/2017 | H02G 3/081 |
| DE | 102018218247 A1 | * | 4/2020 | G01K 1/024 |
| DE | 102018218248 A1 | * | 4/2020 | H04B 17/101 |
| DE | 102018218655 A1 | * | 5/2020 | G08B 17/10 |
| DE | 102018220202 A1 | * | 5/2020 | H01Q 1/42 |
| DE | 102018220204 A1 | * | 5/2020 | H04B 1/0475 |
| DE | 102019206105 B3 | * | 8/2020 | |
| EP | 1319928 A1 | * | 6/2003 | G01D 9/00 |
| EP | 2630614 A1 | * | 8/2013 | G01K 1/024 |
| EP | 2876824 A1 | * | 5/2015 | H04B 10/90 |
| EP | 2876824 B1 | * | 8/2018 | H04B 10/90 |
| EP | 3237990 B1 | * | 3/2019 | G06F 1/12 |
| EP | 3644517 A1 | * | 4/2020 | G01K 1/024 |
| EP | 3657701 A2 | * | 5/2020 | H04B 1/0475 |
| JP | 5672683 B2 | * | 2/2015 | H04B 1/04 |
| JP | 6667512 B2 | * | 3/2020 | F24F 11/30 |
| JP | 6742993 B2 | * | 8/2020 | F24F 11/30 |
| JP | 6742994 B2 | * | 8/2020 | F24F 11/30 |
| KR | 2008013109 A | * | 2/2008 | H04N 19/176 |
| TW | 200929901 A | * | 7/2009 | H01Q 1/247 |
| TW | 201626760 A | * | 7/2016 | G05B 15/02 |
| WO | WO-03052354 A1 | * | 6/2003 | G01D 9/00 |
| WO | WO-2012052607 A1 | * | 4/2012 | G01K 1/024 |
| WO | WO-2016019040 A1 | * | 2/2016 | A61B 5/0022 |
| WO | WO-2016034002 A1 | * | 3/2016 | H04B 10/116 |
| WO | WO-2016100999 A1 | * | 6/2016 | G06F 1/12 |

OTHER PUBLICATIONS

"Quadraturphasenumtastung", https://de.wikipedia.org/wiki/Quadraturphasenumtastung#/media/File:QPSK_Gray_Coded.svg.
"Reference Oscillator Crystal Requirements for the MC1320x, MC1321X, MC1322x, and MC1323x IEEE 802.15.4 Devices", https://www.nxp.com/docs/en/application-note/AN3251.pdf, Apr. 2011.
"Schwingquarz", https://de.wikipedia.org/wiki/Schwingquarz.

(56) References Cited

OTHER PUBLICATIONS

Tanzawa, Toru, et al., "A 2.4-GHZ Temperature-Compensated CMOS LC-VCO for Low Frequency Drift Low-Power Direct-Modulation GFSK Transmitters", IEICE Transactions On Electronics, Institute of Electronics, Tokyo, JP, vol. E88-C, No. 4, Apr. 1, 2005, pp. 490-495, XP001228930, pp. 490-495.

* cited by examiner

CONCEALMENT OF ENVIRONMENTAL INFLUENCES ON THE TRANSMITTING PARAMETERS

CROSS-REFERENCE TO RELATED APPLICATIONS

This application claims priority from German Patent Application No. 10 2018 220 204.4, which was filed on Nov. 23, 2018, and is incorporated herein in its entirety by reference.

Embodiments of the present invention relate to a data transmitter, a data receiver as well as a communication system having a data transmitter and a data receiver and in particular to a concealment of environmental conditions (environmental parameters) in an environment of the data transmitter.

BACKGROUND OF THE INVENTION

Conventionally, clock generators, such as oscillators, are used in radio systems for generating signals. Clock signals provided by the clock generators and, hence, also the transmitting signals derived from the clock signals depend, however, on the environmental conditions (environmental parameters), in particular a temperature, in the respective environments of the data transmitters.

Thus, by evaluating signal parameters of the received signals, it is possible to draw conclusions on the environmental conditions of the respective data transmitters.

SUMMARY

According to an embodiment, a data transmitter may have the steps of: transmitting means configured to transmit a signal, means for changing a signal parameter, configured to change at least one signal parameter of the signal or a parameter on which the signal parameter of the signal depends, wherein the signal parameter depends on at least one environmental parameter in an environment of the data transmitter.

According to another embodiment, a system may have: an inventive data transmitter, and a data receiver, wherein the data receiver is configured to receive a signal, wherein at least one signal parameter of the signal is changed.

Another embodiment may have a data receiver, wherein the data receiver is configured to receive a signal of a data transmitter, wherein the signal or a generation of the signal depends on a clock signal of a clock generator of the data transmitter, wherein the data receiver is configured to determine a signal parameter of the signal and to determine, based on the signal parameter, an environmental parameter to which the clock generator of the data transmitter or the signal is exposed, wherein the data transmitter is configured to compensate a data transmitter-side change of the signal parameter prior to estimating the signal parameter or the environmental parameter.

Another embodiment may have a data receiver, wherein the data receiver is configured to receive a signal of a data transmitter, wherein the signal or a generation of the signal depends on a clock signal of a clock generator of the data transmitter, wherein the data receiver is implemented to compensate an additional tolerance caused by a data transmitter-side change of at least one signal parameter of the signal.

According to another embodiment, a system may have: an inventive data transmitter, and a data receiver, wherein the data receiver is configured to receive a signal of a data transmitter, wherein the signal or a generation of the signal depends on a clock signal of a clock generator of the data transmitter, wherein the data receiver is configured to determine a signal parameter of the signal and to determine, based on the signal parameter, an environmental parameter to which the clock generator of the data transmitter or the signal is exposed, wherein the data transmitter is configured to compensate a data transmitter-side change of the signal parameter prior to estimating the signal parameter or the environmental parameter, or a data receiver, wherein the data receiver is configured to receive a signal of a data transmitter, wherein the signal or a generation of the signal depends on a clock signal of a clock generator of the data transmitter, wherein the data receiver is implemented to compensate an additional tolerance caused by a data transmitter-side change of at least one signal parameter of the signal.

According to another embodiment, a method may have the steps of: generating a transmitting signal, wherein, when generating the transmitting signal, at least one signal parameter of the signal or a parameter of a signal on which the signal parameter of the signal depends is changed, and transmitting the transmitting signal.

According to another embodiment, a method may have the steps of: receiving a signal of a data transmitter, wherein the signal or a generation of the signal depends on a clock signal of a clock generator of the data transmitter, determining a signal parameter of the received signal, determining, based on the determined signal parameter, an environmental parameter to which the clock generator of the data transmitter or the signal is exposed, and compensating a data transmitter-side change of the signal parameter prior to determining the signal parameter or the environmental parameter.

Another embodiment may have a non-transitory digital storage medium having a computer program stored thereon to perform any of the inventive methods, when said computer program is run by a computer.

Embodiments provide a data transmitter having transmitting means configured to transmit a signal and means for changing (e.g., modifying, corrupting or deteriorating) a signal parameter, configured to change (e.g., modify, corrupt or deteriorate) at least one signal parameter (e.g., modulation index, symbol rate, transmitting time, carrier frequency, phase) of the signal or a parameter (e.g., clock signal) on which the signal parameter of the signal depends, wherein the signal parameter depends on at least one environmental parameter in an environment of the data transmitter.

In embodiments, the means for changing the signal parameter can be configured to provide the at least one signal parameter with an offset (e.g., error) in order to change the at least one signal parameter.

In embodiments, the at least one signal parameter can be at least two signal parameters, wherein the means for changing the signal parameter is configured to provide the at least two signal parameters with an offset (e.g., error) each to change the at least two signal parameters.

In embodiments, the offset can be a constant offset and/or a time-varying offset.

In embodiments, the offset can be a random or pseudo-random offset.

In embodiments, the offset can comprise two offset components (e.g., partial errors) changing differently over time.

In embodiments, the offset can comprise two offset components (e.g., partial errors), wherein a first offset component of the two offset components is a constant offset component, and wherein the second offset component of the two offset components is a time-varying offset component.

In embodiments, the offset can comprise two offset components (e.g., partial errors), wherein a first offset component of the two offset components is based on a time-varying function (e.g., a sinus function), and wherein a second offset component of the two offset components is based on a random or pseudo-random process.

In embodiments, the data transmitter can be configured to derive the offset from an immanent parameter of the communication system of the data transmitter or a message to be transmitted with the signal.

In embodiments, the data transmitter can be configured to transmit encrypted information on the offset together with the signal or a further signal (e.g., which is, for example, emitted prior to the signal).

In embodiments, the data transmitter can be configured to derive the offset from a cryptographic key or pair of keys known to the data transmitter and a data receiver.

For example, generating the change (e.g., deterioration) can be generated from a key known to the transmitter and receiver (common encryption algorithms). The same key as for the data or a separate key can be used for the signal parameters. The key can continuously vary over time. By asymmetric encryption, it can be ensured that only one base station physically receives the data. When the receiver does not know the key, he does not know the frequencies/times/artificial phase errors and does not receive the data correctly (at the same time PHY addressing).

In embodiments, the data transmitter can be configured to provide the signal parameter with a correction factor depending on the environmental parameter in the environment of the data transmitter to obtain a corrected signal parameter (e.g., wherein the correction factor corrects (e.g., reduces or compensates) an influence of the environmental parameter on the signal parameter), wherein the means for changing the signal parameter is configured to change the corrected signal parameter (e.g., to conceal or corrupt conclusions on the environmental parameter in the environment of the data transmitter).

In embodiments, the signal parameter can be a modulation index, wherein the offset is a modulation index offset.

In embodiments, the modulation index offset can be free from averages across an averaging length.

In embodiments, the modulation index offset can be adapted in dependence on an accumulated modulation index offset depending on a bit sequence to be transmitted.

In embodiments, the signal parameter can be a symbol rate, wherein the offset is a symbol rate offset.

In embodiments, the signal parameter can be a transmitting time, wherein the offset is a time offset.

In embodiments, an intermission between two subsequent emissions of the signal can be less than an estimation accuracy in symbol durations divided by a double maximum quartz tolerance.

For example, the intermission at an estimation accuracy of, e.g., 1/16 of the symbol duration in a maximum quartz error of, e.g., 20 ppm can be approximately 1500 symbol durations. In detail, according to the above formula: $0.0625/(2*20*10^{-6})=1562.5$ symbols). With double estimation accuracy or double quartz tolerance, the intermission can accordingly be half of that.

In embodiments, the signal parameter can be a carrier frequency, wherein the offset is a frequency offset.

In embodiments, the means for changing the signal parameter can be configured to provide the carrier frequency with a random frequency offset.

In embodiments, the means for changing the signal parameter can be configured to select the frequency offset in dependence on a maximum possible offset of a clock generator of the data transmitter and a receiver-side search range.

In embodiments, the data transmitter can be configured to provide the carrier frequency with a correction factor depending on the environmental parameter in the environment of the data transmitter in order to correct the influence of the environmental parameter on the carrier frequency, wherein the means for changing the signal parameter is configured to select the frequency offset in dependence on a receiver-side search area and the correction factor.

In embodiments, the data transmitter can be configured to transmit the signal based on (e.g., by using) frequency hopping using a plurality of carrier frequencies, wherein the means for changing the signal parameter is configured to provide at least two of the plurality of carrier frequencies with different frequency offsets.

In embodiments, the frequency offsets can be smaller than a receiver-side tolerance width (e.g., in Hertz) of a detection.

In embodiments, the tolerance width can be less than 1/4 of the symbol rate (e.g., in Hertz).

In embodiments, at least one of the frequency offsets (e.g., all frequency offsets) can be between discrete regulation points of a PLL raster of a clock generator of the data transmitter or multiples thereof.

In embodiments, the signal can comprise encrypted information on the different frequency offsets.

In embodiments, the data transmitter can be configured to determine the different frequency offsets based on an immanent parameter of a communication system of the data transmitter or based on a part of the message to be transmitted with the signal.

In embodiments, the signal parameter can be a phase, wherein the offset is a phase offset.

In embodiments, the means for changing the signal parameter can be configured to provide at least two symbols of the signal with different phase offsets.

In embodiments, the phase offsets can be selected such that the same converge towards zero across an averaging length.

In embodiments, the signal parameter can be a transmitting power, wherein the offset is a transmitting power offset.

In embodiments, the environmental parameter can be a temperature
a humidity
an atmospheric pressure
an electromagnetic radiation
a brightness
a movement and/or
a vibration
or a change of the same.

In embodiments, the data transmitter can be configured to adapt the change of the signal parameter in dependence on installation conditions (e.g., of the data transmitter).

For example, the data transmitter can be configured to change (e.g., deteriorate) the signal parameter more or less based on a received signal strength indication (RSSI) measurement. A node positioned close to the base station can change a lot and the packet is still received. A node at the sensitivity limit may change less since the influences in total become relevant.

In embodiments, the data transmitter can be configured to determine the installation conditions based on an RSSI measurement.

In embodiments, the data transmitter can be configured to adaptively adapt the change of the signal parameter in dependence on a telegram length or sub-data packet length or a number of coded bits.

For example, the data transmitter can add more or less change (e.g., deterioration) based on the telegram length/number of coded bits. For example, the data transmitter can be configured to provide shorter telegrams with more frequency offset than longer telegrams.

In embodiments, the data transmitter can be configured to provide two signal parameters of the signal with offsets, wherein the offsets of the two signal parameters at least partly compensate each other.

The data transmitter can be configured, for example, to provide a carrier frequency of the signal with a frequency offset directed in one direction and to provide a symbol rate with an offset directed in the opposite direction. When both offsets have an individual size (e.g., the same size) the offsets will compensate in the receiver such that the reception works. For example, the symbol rate offset and the frequency offset can compensate each other reasonably well.

In embodiments, the data transmitter can know receiving limits of a data receiver receiving the signal, wherein the data transmitter is configured to change (e.g., corrupt) the signal parameter taking into account the receiving limits.

For example, the data transmitter can be configured to utilize the receiving limits by the change.

For example, the concealment can be greater for a coherent receiver than for a non-coherent receiver.

Further embodiments provide a system having a data transmitter according to one of the embodiments described herein and a data receiver, wherein the data receiver is configured to receive a signal, wherein the at least one signal parameter of the signal is changed (e.g., deteriorated).

The data receiver can be implemented such that, for example, the data receiver can cover additional tolerances by the corruption.

Further embodiments provide a data receiver, wherein the data receiver is configured to receive a signal of a data transmitter, wherein the signal or a generation of the signal depends on a clock signal of a clock generator of the data transmitter, wherein the data receiver is configured to determine a signal parameter of the signal and to determine, based on the signal parameter, an environmental parameter to which the clock generator of the data transmitter or the signal is exposed, wherein the data transmitter is configured to compensate a data transmitter-side change of the signal parameter prior to estimating the signal parameter or the environmental parameter.

In embodiments, the data receiver can know the data transmitter-side change of the signal parameter (e.g., the offset with which the signal parameter is provided on the data transmitter side).

In embodiments, the data receiver can be configured to derive the data transmitter side change of the signal parameter (e.g., the offset with which the signal parameter is provided on the data transmitter side) from an immanent parameter of the communication system of the data receiver or a message transmitted with the signal.

In embodiments, the data receiver can be configured to derive the data transmitter-side change of the signal parameter (e.g., the offset with which the signal parameter is provided on the data transmitter side) from a cryptographic key or pair of keys known to the data transmitter and the data receiver.

Further embodiments provide a data receiver, wherein the data receiver is configured to receive a signal of a data transmitter, wherein the signal or generation of the signal depends on a clock signal of a clock generator of the data transmitter, wherein the data receiver is implemented to compensate an additional tolerance caused by a data transmitter-side change (e.g., deterioration) of at least one signal parameter of the signal (e.g., wherein the additional tolerance is additional to an (e.g., natural) tolerance caused by a data transmitter-side change of the at least one signal parameter due to an environmental parameter) (e.g., +−20 kHz by natural phenomenons that reveal the temperature, therefore additionally +−40 kHz artificial change. The receiver can +−60 kHz instead of +−20 kHz).

In embodiments, the data receiver can know the data transmitter-side change of the signal parameter (e.g., the offset with which the signal parameter is provided on the data transmitter side).

In embodiments, the data receiver can be configured to derive the data transmitter-side change of the signal parameter (e.g., the offset with which the signal parameter is provided on the data transmitter side) from an immanent parameter of the communication system of the data receiver or a message transmitted with the signal.

In embodiments, the data receiver can be configured to derive the data transmitter-side change of the signal parameter (e.g., the offset with which the signal parameter is provided on the data transmitter side) from a cryptographic key or pair of keys known to the data transmitter and the data receiver.

Further embodiments provide a system having a data transmitter according to one of the embodiments described herein and a data receiver according to one of the embodiments described herein.

Further embodiments provide a method. The method includes a step of generating a transmitting signal, wherein, when generating the transmitting signal, at least one signal parameter (e.g., modulation index, symbol rate, transmitting time, carrier frequency, phase) of the signal or a parameter (e.g., clock signal) on which the signal parameter of the signal depends is changed. Further, the method includes a step of transmitting the transmitting signal.

Further embodiments provide a method. The method includes a step of receiving a signal of a data transmitter, wherein the signal or a generation of the signal depends on a clock signal of a clock generator of the data transmitter. Further, the method includes a step of determining a signal parameter (112) of the received signal. Further, the method includes a step of determining, based on the determined signal parameter, an environmental parameter to which the clock generator of the data transmitter (130) or the signal is exposed. Further, the method includes a step of transmitting the transmitting signal. Further, the method includes a step of compensating a data transmitter-side change of the signal parameter prior to determining the signal parameter or the environmental parameter.

The present invention is based on the idea of concealing environmental conditions (e.g. environmental parameters) in an environment of a data transmitter that are co-transmitted to a data receiver due to their influence on the characteristics of a transmitted signal (e.g. to obstruct receiver-side estimation of the environmental conditions (e.g. one or several environmental parameters) by evaluating the signal characteristics (e.g. of one or several signal parameters)).

In embodiments, known environmental influences can be compensated on the data transmitter side.

In embodiments (e.g. remaining) environmental influences can be concealed by artificial deviations (e.g. of the signal parameters).

In embodiments, a receiver-side estimation accuracy of specific signal parameters can be reduced by manipulating the signals (e.g. the signal parameters).

BRIEF DESCRIPTION OF THE DRAWINGS

Embodiments of the present invention will be detailed subsequently referring to the appended drawings, in which.

DETAILED DESCRIPTION OF THE INVENTION

In the following description of the embodiments of the present invention, the same or equal elements are provided with the same reference numbers in the figures, such that the description of the same is interexchangeable.

In typical radio systems, for generating transmitting signals, a reference frequency is needed, from which the respective radio chip or the respective frontend derives the needed clocks. This reference frequency is typically provided by a clock generator, such as oscillating quartz (quartz) [1]. Data transmitters, such as nodes or sensor nodes, typically include two different clock generators. This can, for example, be a high-frequency (HF) clock generator oscillating at a frequency of several MHz and a low-frequency clock generator (LF) normally oscillating at a frequency of 32768 Hz. Normally, the high-frequency clock generator is more accurate (as regards to the deviation from the nominal frequency) and more power-consuming. The low-frequency clock generator is less accurate, but very power-efficient.

Figure 1:
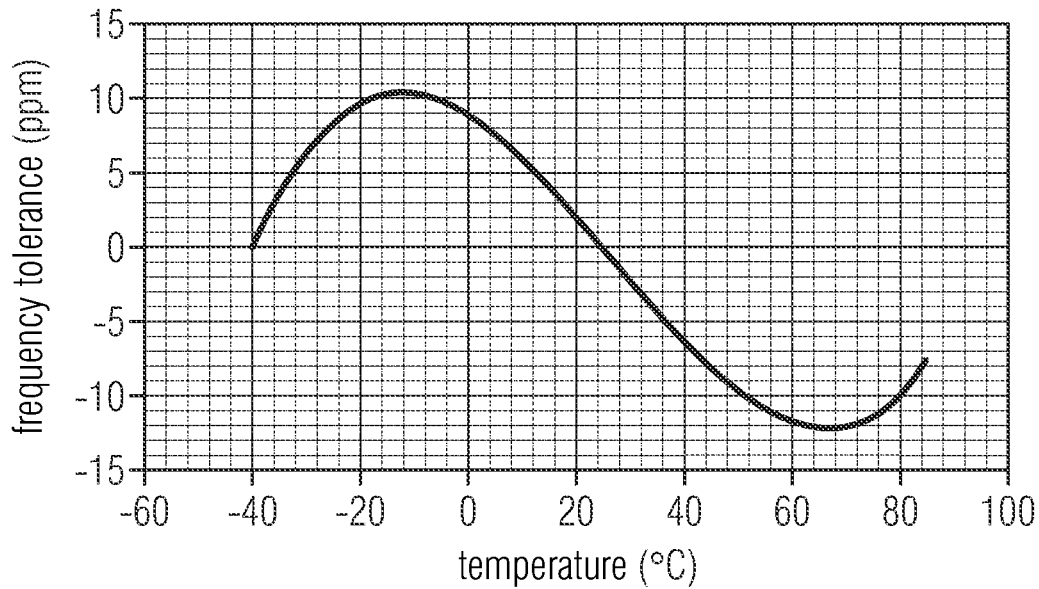
FIG. 1 shows, in a diagram, a deviation of a high-frequency clock generator from the reference frequency in dependence on the temperature.
Figure 2:
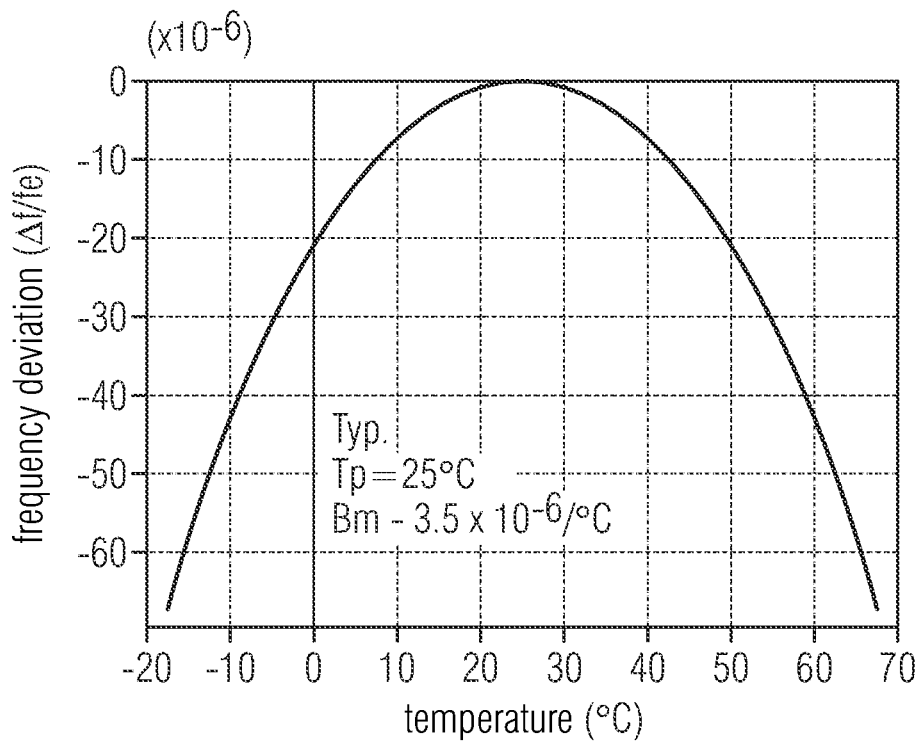
FIG. 2 shows, in a diagram, a deviation of a low-frequency clock generator from the reference frequency in dependence on the temperature.

However, the reference frequencies provided by the clock generators (oscillating quartzes) typically depend on environmental parameters. FIG. 1 shows exemplarily the dependency of the reference frequency over temperature for any high-frequency clock generator (frequency stability of a high-frequency oscillating quartz over the ambient temperature [2], while FIG. 2 shows exemplarily the dependency of the reference frequency over temperature for any low-frequency clock generator (frequency stability of a low frequency (LF) 32768 KHz quartz over the temperature [5]). Here, the ordinates each describe the frequency tolerance in ppm and the abscissas each the temperature in ° C.

Apart from the temperature, there are further dependencies of the clock generator (quartz) on at least the following parameters:
humidity
pressure
EM radiation
brightness
vibration/movement All these parameters have an influence on the reference frequency provided by the clock generator (oscillating quartz). If this reference frequency is used for generating the transmitting signals, these dependencies have a direct effect on the transmitting signal and hence on the transmitting parameters (signal characteristics).

The following transmitting parameters are of specific importance:
transmitting frequency
transmitting time
symbol rate
modulation index (in frequency shift keying methods, such as FSK or GMSK)

Doppler (only in case of vibration/movement).

Thus, when generating and radiating a radio signal in a transmitter, environmental conditions of the transmitter have an effect on the radiated radio signal. In particular the frequency of oscillators, serving as reference for carrier or modulation frequencies in the transmitter, can be modified by environmental influences. In non-temperature corrected oscillators (quartzes), for example, the frequency correlates with the ambient temperature. Analogous effects can also occur for humidity, electromagnetic radiation, brightness or vibrations. Above that, movements or vibrations of the transmitter and its antenna have an effect on the radiated signal due to Doppler shifts.

By these characteristics, the radiated signal carries, apart from the primary information, further implicit information on the environmental conditions or characteristics of the transmitter. For illustrating purposes, this phenomenon is shown graphically in FIG. 3a.

Figure 3A:
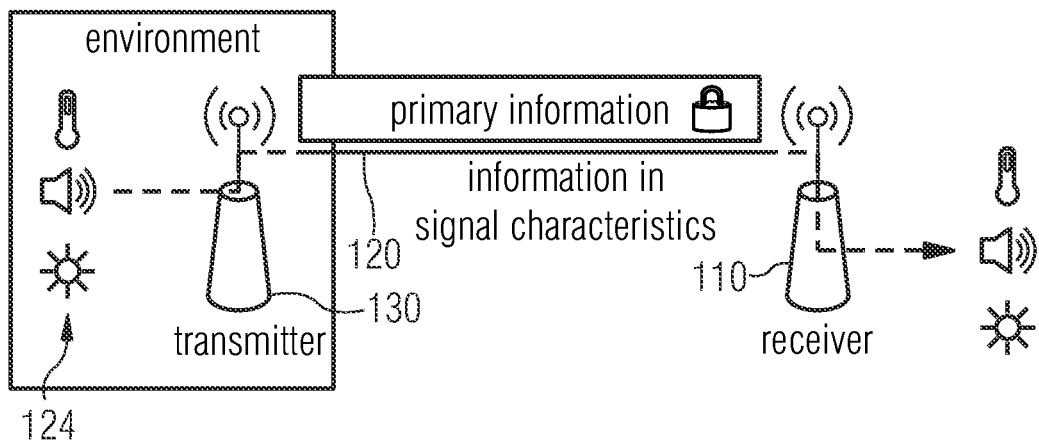
FIG. 3a is a schematic view of a system having a data transmitter and a data receiver as well as a transmission of a signal between the data transmitter and the data receiver, wherein the data receiver can draw conclusions on an environmental parameter in the environment of the data transmitter by evaluating at least one signal parameter of the signal, according to an embodiment of the present invention.

In detail, FIG. 3a shows a schematic view of a system 100 having a data transmitter 130 and a data receiver 110 as well as a transmission of a signal 120 between the data transmitter 130 and the data receiver 110, wherein the data receiver 110 can draw conclusions on an environmental parameter 124 in the environment of the data transmitter 130 by evaluating at least one signal parameter of the signal 120.

As can be seen in FIG. 3a, the environmental conditions on the side of the data transmitter 130 have an effect on the signal 120 transmitted by the data transmitter 130, such that the signal 120 additionally comprises, apart from primary information, information on the environmental conditions in the signal characteristics. In other words, FIG. 3a shows a radio communication between transmitter 130 and receiver 110, wherein, apart from the transmitted primary information, the information on the signal characteristics is also shown.

If it is possible to determine (e.g. to estimate) the signal characteristics at the receiver 110, conclusions on the environmental conditions at the transmitter 130, at the receiver 110 or in-between can be drawn directly based on the correlation between the signal characteristics and the environmental conditions. However, since the greatest tolerances occur at the transmitter 130, environmental conditions are mostly determined at the transmitter. The temperature can, for example, be determined at the transmitter from a determined frequency offset (deviation from the expected nominal frequency) via the curve shown in FIG. 1.

Modern software defined radio (SDR) receivers allow a very accurate determination of the parameters of a received signal. In that way, for example, a frequency deviation in the range of a few Hz can be detected. This allows the complete or partial reconstruction of environmental conditions or characteristics of the transmitter from the determined signal parameters in the receiver.

Since this meta information is transported by physical characteristics on signal level, the same is not detected by superordinate measures of access protection such as encryption.

Therefore, reconstruction can be made by any non-authorized receivers. This represents significant problems with respect to data protection and security for all radio systems having transmitters in non-public areas.

Due to the high density of devices having radio interfaces, extensive target areas arise. Potential scenarios affect both private households as well as industrial or state institutions.

Here, the determination of the environmental conditions does not depend on a specific radio system, any radio system (e.g. WLAN, Bluetooth, radio weather stations, . . . ) can be used for a determination. If several systems exist, a combination can also be used for the determination.

For example, based on a temperature profile over the course of the day it can be determined whether persons stay in a room, a flat or a house. This information can, for example, be used by robbers or can be used for spying activities.

Since apart from the determination of the environmental conditions, frequently, localization of the transmitters, can be performed as well, these are person-related data which are to be pseudonymized according to the new Data Protection Act [4].

Figure 3B:
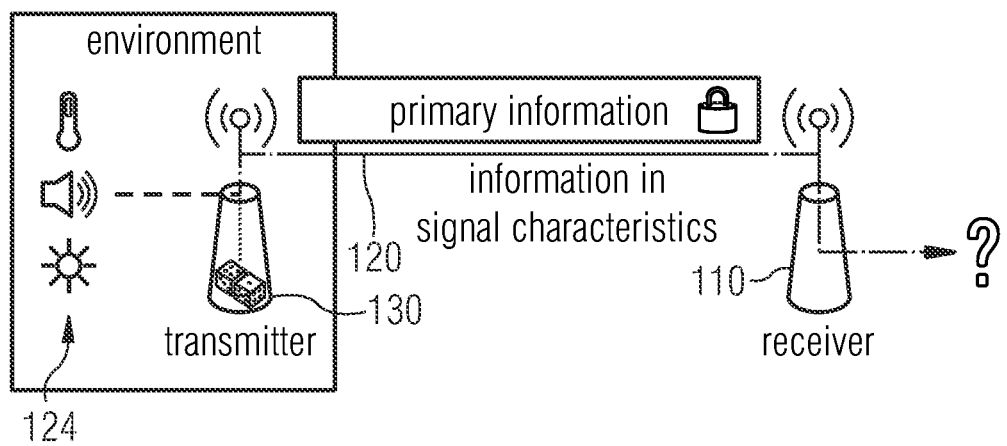
FIG. 3b is a schematic view of a system having a data transmitter and a data receiver as well as a transmission of a signal between the data transmitter and the data receiver with a concealment of at least one signal parameter of the signal according to an embodiment of the present invention.

Embodiments of the present invention relate to technologies by which the signal characteristics and, hence, environmental conditions can be concealed, such as indicated in FIG. 3b.

In detail, FIG. 3b shows a schematic view of a system having a data transmitter 130 and a data receiver 110, as well as a transmission of a signal 120, between the data transmitter and the data receiver with a concealment of at least one signal parameter of the signal 120 according to an embodiment of the present invention. Caused by concealment of at least one signal parameter of the signal 120, the data receiver 110 can no longer draw conclusions on an environmental parameter 124 in the environment of the data transmitter 130 by evaluating the at least one signal parameter.

Figure 4:
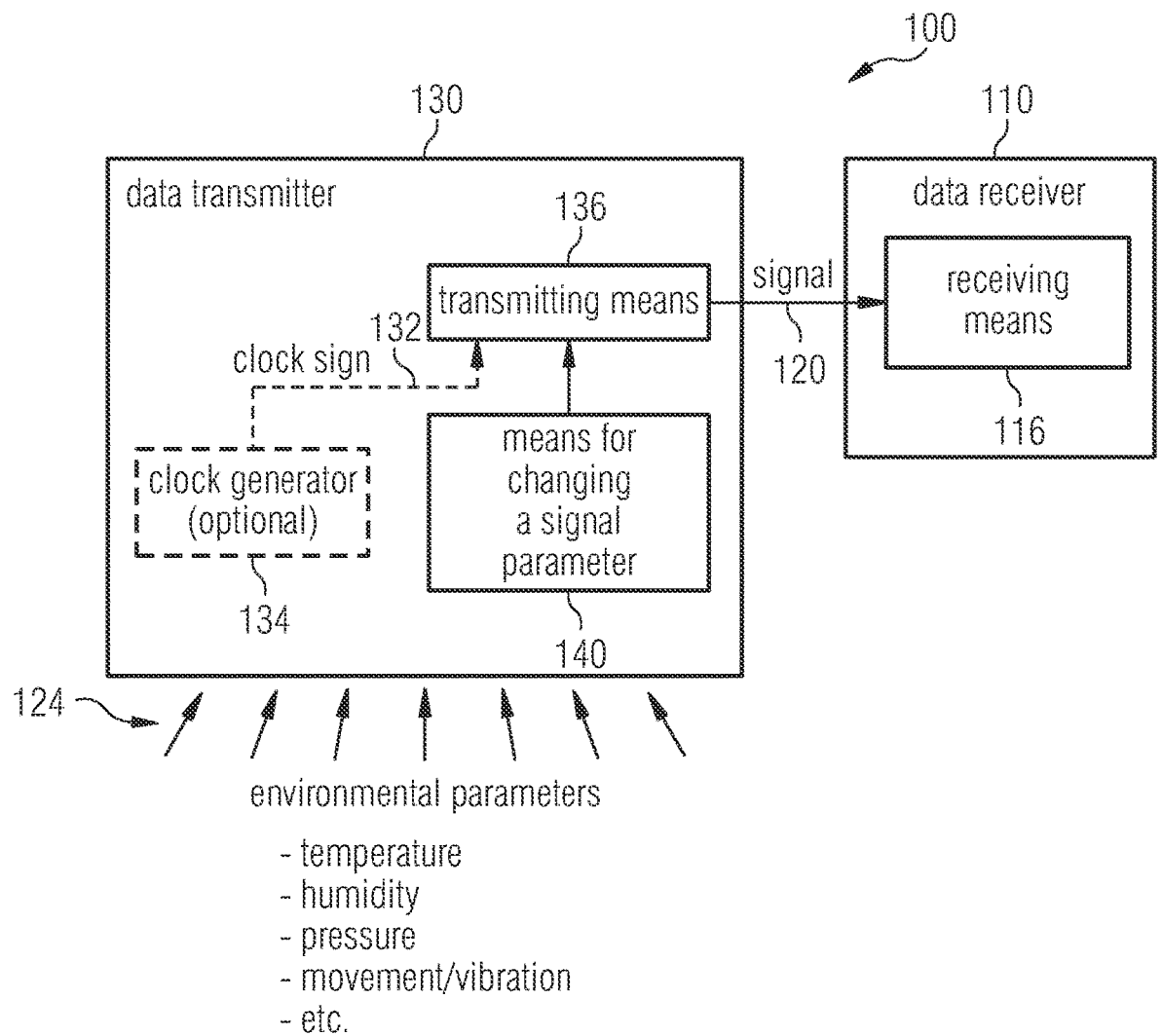
FIG. 4 is a schematic block diagram of a system having a data transmitter and a data receiver according to an embodiment of the present invention.

FIG. 4 shows a schematic block diagram of a system 100 having a data transmitter 130 and a data receiver 110 according to an embodiment of the present invention.

The data transmitter 130 includes transmitting means 130 (e.g. transmitter, radio chip/frontend) configured to transmit a signal 120.

The data receiver 110 includes receiving means 116 (e.g. receiver) configured to receive the signal 120.

An environmental parameter 124 acting on the data transmitter 130 can influence the transmitting means 136 or other components of the data transmitter 130, such as a clock generator 134 of the data transmitter, such that at least one signal parameter of the signal 120 depends on the environmental parameter 124 in the environment of the data transmitter 130.

For example, the environmental parameter 124 (e.g., a temperature or a temperature change) acting on the clock generator 134 of the data transmitter 130 can influence the clock generator 134 and therewith at least one signal parameter (e.g., frequency) of the clock signal 132 provided by the clock generator 134. Since generating the signal 120 transmitted by the data transmitter 130 is based on the clock signal 132 of the clock generator, the environmental parameter 124 does not only influence a signal parameter (e.g., frequency) of the clock signal 132 but also a signal parameter (e.g., a signal characteristic, such as a carrier frequency) of the signal 120 transmitted by the data transmitter 130.

Thus, the data receiver 110 can draw conclusions on the environmental parameter (e.g., temperature) in the environment of the data transmitter 130 or estimate the same by evaluating the signal parameter 112 of the received signal 120.

Thus, in embodiments, the data transmitter 130 includes means 140 for changing (e.g., modifying, corrupting, concealing or deteriorating) a signal parameter that is configured to change (e.g., modify, conceal, corrupt or deteriorate) at least one signal parameter (e.g., modulation index, symbol rate, transmitting time, carrier frequency, phase) of the signal 120 or a parameter (e.g., clock signal 132) on which the signal parameter of the signal 120 depends.

By changing the at least one signal parameter of the signal 120, receiver-side estimation of the environmental parameter 124 based on an evaluation of the at least one signal parameter can be obstructed.

In embodiments, the means 140 for changing the signal parameter can be configured to provide the at least one signal parameter with an offset (e.g., an error) in order to change (e.g., deteriorate) the at least one signal parameter.

For example, the means 140 for changing the signal parameter can be configured to provide the at least one signal parameter directly with an offset to change the signal parameter. Obviously, the means 140 for changing the signal parameter can also be configured to provide a different parameter on which the signal parameter depends with an offset, such as a clock frequency of the clock signal 132 of the clock generator 134.

In embodiments, the at least one signal parameter can be at least two signal parameters, wherein the means for changing the signal parameter can be configured to provide the at least two signal parameters with one offset (e.g., error) each in order to change the at least two signal parameters.

In embodiments, the offset can be a constant offset and/or a time-varying offset.

In embodiments, the offset can be a random or pseudo-random offset.

In the following, further embodiments of the present invention will be described in more detail.

1. Changing (e.g., Deteriorating) the Measurement Accuracy of the Receiving Parameters The following embodiments are based on the fact that the data transmitter 130 does not necessarily have to know the environmental conditions (e.g., environmental parameters 124). This means the data transmitter 130 has generally no information on its environmental conditions. However, the following embodiments can be applied accordingly when the data transmitter 130 knows the environmental conditions.

1.1 Changing (e.g., Deteriorating) the Modulation

For determining the environmental conditions at the data transmitter 130, among others, the accuracy of the modulation can be used.

For example, in an FSK modulation (FSK=Frequency Shift Keying), the deviation of the modulation index from the expected value can be determined. From this deviation, subsequently, the environmental conditions at the data transmitter 130 can be derived.

Typically, the receiver 116 of the data receiver 110 can tolerate a certain degree of modulation error without obtaining a significantly worse performance in decoding.

This phenomenon can be used in that the modulation is artificially made so bad that the environmental conditions in the data transmitter 130 can no longer be inferred or the accuracy is no longer good enough. Here, two cases have to be differentiated:

The receiver 116 of the data receiver 110 can tolerate far greater modulation errors than they are influenced by the environmental conditions in the data transmitter 130.

The receiver 116 of the data transmitter 110 can only tolerate modulation errors that are within the scale of the environmental conditions.

In the first case, it is sufficient to add a constant random error which can be significantly greater than the maximum error to be expected by the environmental conditions. Changing the random error is possible at any time. However, by a constant error, only the exact value can be concealed, for concealing changes a time-varying process is needed.

In the second case, a time variable offset can be added to the error from the environmental conditions. This can be performed, for example, by an (evenly distributed) random process.

Obviously, a combination of constant (hardly changing) and a time variable error can be applied. It only has to be considered that the overall error is smaller than the allowable tolerance of the system.

In the ideal case, the randomly added error should only be known to the data transmitter 130, so that a correction of this value when receiving is not possible and hence calculating back to the environmental conditions cannot be performed.

If, however, the environmental conditions of the data transmitter 130 are explicitly inferred from this parameter, this value can be communicated to the data receiver 110 in advance or in a telegram (or message) in an encrypted manner. Thus, an attacker who cannot decrypt the encrypted data thus has no option of determining the environmental conditions of the data transmitter 130.

As an alternative to the direct transmission of the selected frequency offset, the same can also be determined based on an immanent parameter of the system. This can, for example, be part of the message or a previously transmitted encrypted message. This offers the advantage that no additional information on the selection of the used offset(s) has to be signalized/transmitted between the data receiver 110 and the data transmitter 100.

In embodiments, on the data transmitter side, an artificial error can be added to the modulation error which arises due to the environmental conditions at the data transmitter 130. Depending on the scenario, this can be a constant value or a time-varying value.

In embodiments, on the data transmitter side, the modulation index error can be selected such that the modulation index error is bias free (average value free) across an averaging length.

In embodiments, on the data transmitter side, the accumulated modulation index error can be determined adaptively during transmission, depending on the bit sequence, more or less concealment can be added.

1.2 Changing (e.g., Deteriorating) the Symbol Rate

Similar to the usage of the modulation error, the deviation of the transmitted symbol rate from the expected one can be used for determining the environmental conditions at the data transmitter 130.

Similar to the modulation error, the receiver 160 of the data receiver 110 can also (additionally) tolerate a certain degree of symbol rate error without having to expect a significantly worse performance.

This phenomenon can also be used in that the symbol rate is artificially made so bad that the environmental conditions in the data transmitter 130 can no longer be inferred or the accuracy is no longer good enough. Here, two cases have to be differentiated:

The receiver 116 of the data receiver 110 can tolerate far greater symbol rate errors than they are influenced by the environmental conditions in the data transmitter 130.

The receiver 116 of the data receiver 110 can only tolerate symbol rate errors that are within the scale of the environmental conditions.

The same case discrimination applies as in the deterioration of the modulation. Here, however, it also has to be considered that the entire artificial error is smaller than the tolerance of the receiver 116 of the data receiver 110, but at least the amount of the error due to the environmental conditions.

In embodiments, on the data transmitter side, an artificial error can be added to the symbol rate error occurring due to the environmental conditions at the data transmitter 130. Depending on the scenario, this can be a constant value, a time-varying value or a combination.

In embodiments, the receiver 116 of the data receiver 110 can be configured to handle larger tolerances in the symbol rate.

1.3 Changing (e.g., Deteriorating) the Time Differences

Another method for determining the environmental conditions at the data transmitter 130 is the measurement of the time between two emissions if the nominal time between the emissions is known.

This method can also be applied if a transmission consists of several data packets or partial data packets. This is, for example, the case for Bluetooth or MIOTY. Here, additionally, frequency hopping is used.

After at least two (partial) data packets have been received, the relative receiving time can be determined for each (partial) data packet. The difference of the two times results in the time delay between the (partial) data packets. If this value is compared to the expected value, the time error and hence again the environmental conditions at the data transmitter 130 can be inferred therefrom.

Similar to the two above concealment methods for the modulation and the symbol rate, a random time offset can take place between the emissions or between the (partial) data packets.

If the data receiver 110 has a continuous detection of the emissions/(partial) data packets, nothing else has to be considered since the data receiver 110 continuously listens for new emissions. If, however, time-synchronized transmission to a previous emission (also from the data receiver, e.g., a beacon) is performed, normally, no further detection of the emissions/(partial) data packets takes place. By adding the random time offsets, the data receiver 110, however, can no longer decode the further emissions/(partial) data packets. For solving this problem, the used time offsets or the mapping function can be communicated to the actual data receiver 110 in advance in an encrypted manner or the data transmitter 130 (e.g., node) and the data receiver 110 (e.g., base station) know the times in advance. Alternatively, the data receiver 110 can also communicate the random time offsets to the data transmitter 130 in advance.

In embodiments, on the data transmitter side, a (random) intermission can be added to or deducted from the defined intermission times between or within the emissions (of the signal 120). Depending on this scenario, this can be a constant value or time-varying value.

When considering the frequency stability over the ambient temperature for the exemplarily used oscillating quartz shown in FIG. 1, it can be seen that the maximum error is below 15 ppm.

If the intermission between two emissions/(partial) data packets is, for example, one second, the maximum error is 15 µs, at an insecurity of the quartz of 15 ppm. In an exemplary symbol rate of 50 kSym/s, a symbol duration of 20 µs results. For obtaining a temperature resolution in the range of degrees, the estimation accuracy should be better than 1 µs. In the exemplary symbol rate, 1 µs corresponds to 1/15 of the symbol duration. Therefore, estimation would have to be accurate up to 1/15 symbol which is hard to obtain in practice.

The slower the symbol rate is selected, the more difficult it becomes to obtain the needed temporal resolution.

If the intermission is selected accordingly short, no concealment of the time between the emissions is needed since the estimation accuracy is not sufficient. The smaller the symbol rate used by the system, the longer the intermissions that are not to be concealed can be selected.

If the intermission between the emissions becomes greater each time, concealment as above with (random) offsets can be performed for these individual times.

In embodiments, on the data transmitter side, when the intermission between the emissions is so small that no sufficiently accurate estimation can be made, no concealment can be applied. If the intermission exceeds this limit, concealment can be performed for these times, as described above.

In embodiments, on the data transmitter side, the intermission between/within the emission(s) can be kept so small that no sufficiently accurate estimation can be performed.

In embodiments, on the data transmitter side, the concealment can be switched on or off depending on the scenario.

1.4 Changing (e.g. Deteriorating) the Frequency Offset Estimation

The most useful or simplest method for determining the environmental conditions at the data transmitter 130 is to estimate the frequency offset between the received signal and the expected nominal frequency.

Modern software defined radio receivers can estimate the carrier frequency of the received signal to a few Hertz accuracy. Various methods exist for this, which are not the subject matter of this invention.

Due to the relatively high carrier frequencies in the higher MHz range, small influences of the quartz of a few ppm nevertheless have a large influence on the carrier frequency. Example: A carrier frequency of 800 MHz is selected. The quartz curve shown in FIG. 1 results in a maximum deviation of 15 ppm, which corresponds to a maximum frequency offset of 12 kHz or 800 Hz/ppm for the 800 MHz carrier frequency selected as an example. If the accuracy of the estimate is 10 Hz as an example, a resolution of 1/80 ppm can be achieved, which corresponds to an accuracy in the sub-degree range on the basis of the quartz curve shown in FIG. 1.

If frequency hopping is used during transmission, the difference between two emissions/(partial) data packets can also be determined as an alternative to measuring the absolute frequency and comparing it with the nominal frequency, and the deviation can be determined with knowledge of the expected difference.

Similar to the above concealment methods, a random frequency offset can also be added to the emissions or the (partial) data packets. Either a constant offset can be selected or a new value is determined (randomly) for each emission. So that an attacker cannot subtract the artificial offset, it is important that the value is known only to the data transmitter 130 or is transmitted to the data receiver 110 in an encrypted manner.

In embodiments, the carrier frequency of the emissions or the (partial) data packets can be provided with a (random) frequency offset.

Since the data receiver 110 typically does not know the frequency offset of the data transmitter 130 (which, according to FIG. 1, depends on the temperature at the data transmitter 130), the data receiver 110 has to perform a search over a defined frequency search range. This range is normally designed in such a way that the limits are defined by the maximum allowable quartz offset.

If an additional frequency offset is now added to the emission, it has to be ensured that the limits of the search range are not exceeded. Example: The frequency search range of the receiver is ±20 kHz. Offsets of ±19 kHz can occur due to a quartz offset. This leaves ±1 kHz allowance for the artificial (random) offset.

Figure 5:
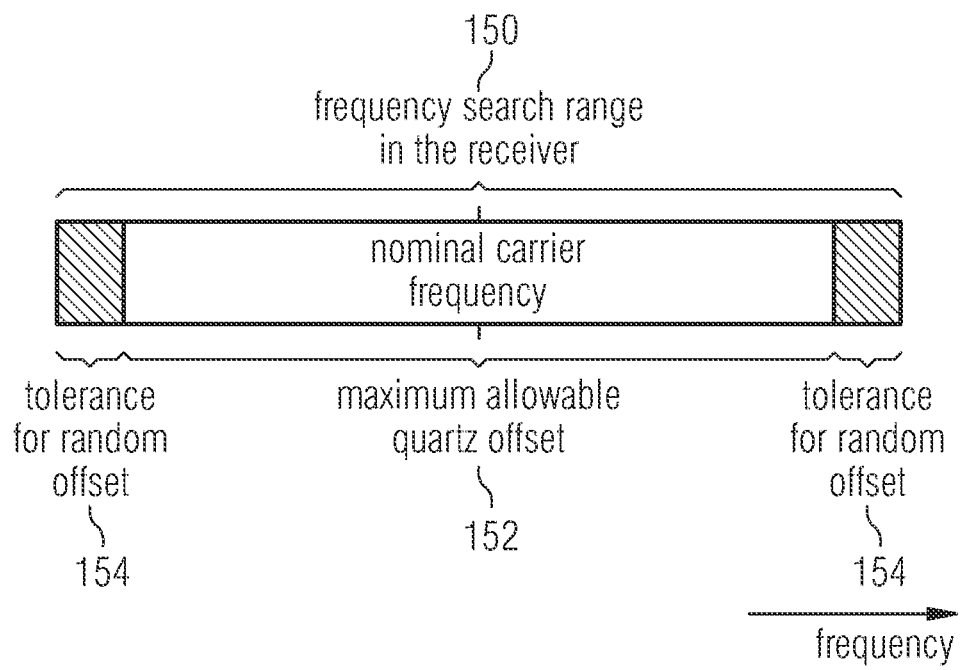
FIG. 5 is a schematic view of the frequency search range of the data receiver, maximum allowable frequency offset range of the signal which can occur due to a maximum allowable quartz offset as well as a remaining range for the frequency offset.

FIG. 5 shows a schematic view of the frequency search range 150 of the data receiver 110, a maximum allowable frequency offset range 152 of the signal 120 (or the carrier frequency (=signal parameter) of the signal 120), which can occur due to a maximum allowable quartz offset, and a remaining range 154 for the frequency offset. The abscissa describes the frequency. In other words, FIG. 5 shows an overview of the frequency search range 150 of the data receiver 110 and a remaining range 154 for artificial offsets.

In embodiments, the (random) artificial frequency offset can be selected on the data transmitter side depending on the search range 150 of the data receiver 110 and the maximum possible offset of the quartz.

As shown above, the remaining margin for the artificial frequency offset can be very small compared to the quartz offset, which means that the environmental conditions of the transmitter can only be concealed to a very limited extent.

If the environmental conditions are at least partially known to the data transmitter 130, the signal characteristics can be corrected (e.g. by adapting the carrier frequency). This correction reduces the residual error tolerance of the oscillator, allowing a wider range for the artificial (random) frequency offset.

Figure 6:
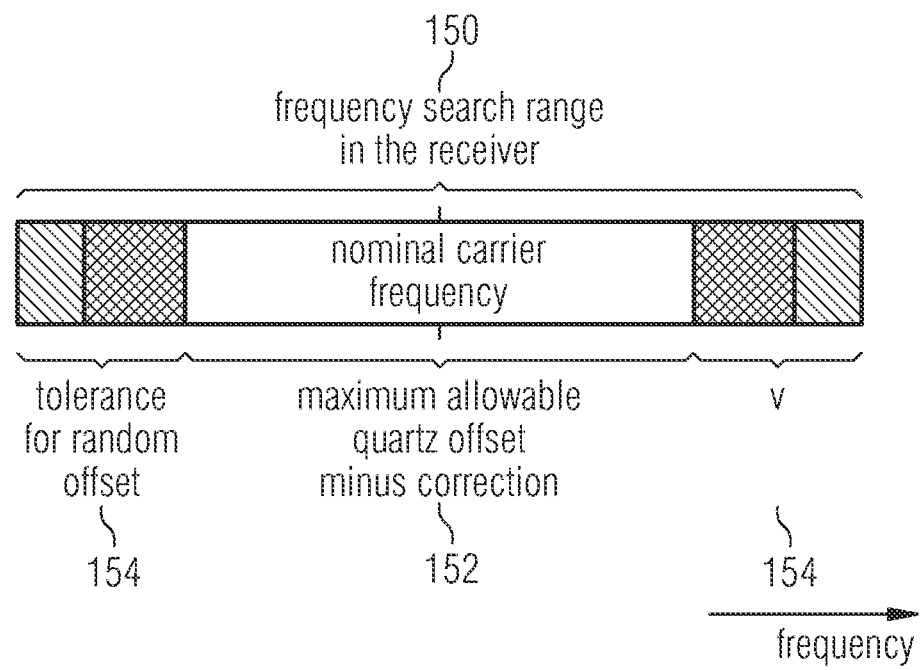
FIG. 6 is a schematic view of the frequency search range of the data receiver, a maximum allowable frequency offset range of the signal which can occur due to a maximum allowable quartz offset, each prior and after a correction of an influence of the environmental parameter, as well as the remaining range for the frequency offset.

FIG. 6 shows a schematic view of the frequency search range 150 of the data receiver 110, a maximum allowable frequency offset range 152 of the signal 120 (or the carrier frequency (=signal parameter) of the signal 120), which can occur due to a maximum allowable quartz offset, both before and after correction of an influence of the environmental parameter 124, and a remaining range 154 for the frequency offset. The abscissa describes the frequency. In other words, FIG. 6 shows an overview of the frequency search range 150 of the data receiver 110 with previous (partial) correction of the environmental influences and the remaining range 154 for artificial offsets.

In embodiments, the range 154 of the (random) artificial frequency offset can be determined on the data transmitter side depending on the search range 150 of the data receiver 110 and the correction factor on the data transmitter 130, wherein the residual error is determined from the subtraction of the maximum possible offset of the quartz and the correction factor.

If frequency hopping is used during transmission, the difference between two emissions/(partial) data packets can also be determined as described above instead of measuring the absolute frequency and comparing it with the nominal frequency. From the deviation, the environmental conditions of the data transmitter 130 can then be inferred again.

If an artificial (random) frequency offset is now applied to the transmission(s) or (partial) data packets, the receiving frequency shifts and the attacker can no longer infer the environmental conditions of the data transmitter 130 from the absolute frequency position. However, due to frequency hopping, transmission still takes place on several channels, wherein the difference between the channels has not changed due to the artificial frequency offset. The attacker is thus still able to infer the environmental conditions of the data transmitter 130 from the frequency difference between the transmission channels.

To avoid this problem, it is advantageous to introduce another artificial (random) frequency offset between the frequency jumps. This means that one of the two transmission frequencies is provided with a further artificial (random) frequency offset. Alternatively, an artificial (random) frequency offset can be added to both transmission frequencies, wherein it has to be considered that not the same offset is applied to the two transmission frequencies or that the two offsets are uncorrelated.

If more than two emissions/(partial) data packets are performed, several different artificial (random) frequency offsets are needed.

In embodiments, if more than one transmission channel is used on the data transmitter side, the differences between the emissions/(partial) data packets can be concealed in addition to concealing the carrier frequency.

In some systems, detection and synchronization is typically performed on the basis of synchronization sequences in the emissions/(partial) data packets. In order to obtain a better estimation value, partly, a combination over several emissions/(partial) data packets is used. However, this combination implies a known distance between the emissions/(partial) data packets. By applying artificial (random) frequency offsets between the emissions/(partial) data packets, no correct combined detection and synchronization can be performed in the data receiver any longer.

In order to avoid this problem, the data receiver 110 can transmit the information which frequency offsets were applied between the emissions/(partial) data packets to the data receiver 110 in encrypted form in advance. These frequency offsets are then used for detection and synchronization. Alternatively, the frequency offset(s) can also be communicated to the data transmitter 130 in a previous message.

The attacker, who cannot decrypt the previous message, has no information on the used frequency offsets between the emissions/(partial) data packets and can hence not infer the environmental conditions of the data transmitter 130.

The frequency offsets can also be selected on the basis of an immanent parameter of the system. This can be, for example, a part of a pre-sent encrypted message. This has the advantage that between the data receiver 110 and the data transmitter 130 no additional information about the choice of offset used has to be signaled/transmitted.

In embodiments, encrypted information can be transmitted in advance to the data receiver 110, on the basis of which the data receiver 110 can determine the frequency offsets used by the data transmitter 130 between the emissions/(partial) data packets. These frequency offsets are then used for detection and synchronization.

In embodiments, the selection of the used offset can be made implicitly by an immanent parameter of the system, wherein this parameter can, for example, be part of an encrypted message.

However, the disadvantage of signaling the used frequency offset is that the data receiver 110 has to carry out its own detection with the different frequency offsets for each data transmitter 130 to be received. This means that considerably more computing power is needed, which results in higher power consumption and thus increases operating costs.

Typically, the detection is configured to tolerate a certain degree of frequency offset. This is due to the fact that the data receiver 110 does not know the exact (total) frequency offset of the emission/the (partial) data packets and therefore has to determine the same. For this purpose, as shown in FIG. 5, there is a so-called frequency search range in the data receiver 110. In order to search this efficiently, it is advantageous if there is a high tolerance against frequency offsets. This tolerance reduces the number of needed parallel detections needed on adjacent channels. A typical value for this tolerance width is $f_{sym}/8$ (i.e. ⅛ of the symbol rate). This tolerance width can now also be used for the random frequency offsets between the emissions/(partial) data packets in order to conceal the environmental conditions at the data transmitter 130. Furthermore, an artificial (random) frequency offset can be added to the complete emission, which is greater than the tolerance width, as long as the search range according to FIG. 5 is not exceeded. Within the transmission, a second artificial (random) frequency offset smaller than the tolerance width of the detection can be added between the emissions/(partial) data packets.

Due to the limitation of the variation width of the artificial (random) frequency offset between the emissions/(partial) data packets, however, there is no limitation in terms of concealment, since when measuring the frequency difference without concealment between two channels, only very small deviations are to be expected, which are usually exceed by far by the tolerance width.

In embodiments, the artificial (random) frequency offset between the emissions/(partial) data packets can be selected to be smaller than the tolerance width of the detection.

In embodiments, a function that has no influence on the performance can be defined for the concealment, such as a sine function of the concealment. The frequency concealment changes with the symbol. The function can be selected such that the same has no loss of performance.

When concealing by random frequency offsets, it should be noted that discrete regulation frequency points may be present when phase-locked loops are used for reference clock generation. In this case, it is not sufficient to shift the frequency to another discrete regulation point in the regulation point raster by oscillator manipulation, since the position of the regulation point raster itself can already reveal environmental information.

The absolute influence remains concealed by the unknown offset, but relative changes can be reconstructed. This is particularly the case when the influences of the events to be observed do not exceed the intervals of the regulation points. But even with stronger influences, the occurrence of the event can still be detected if it is not sufficiently concealed by a superposition with other influences.

Figure 7:
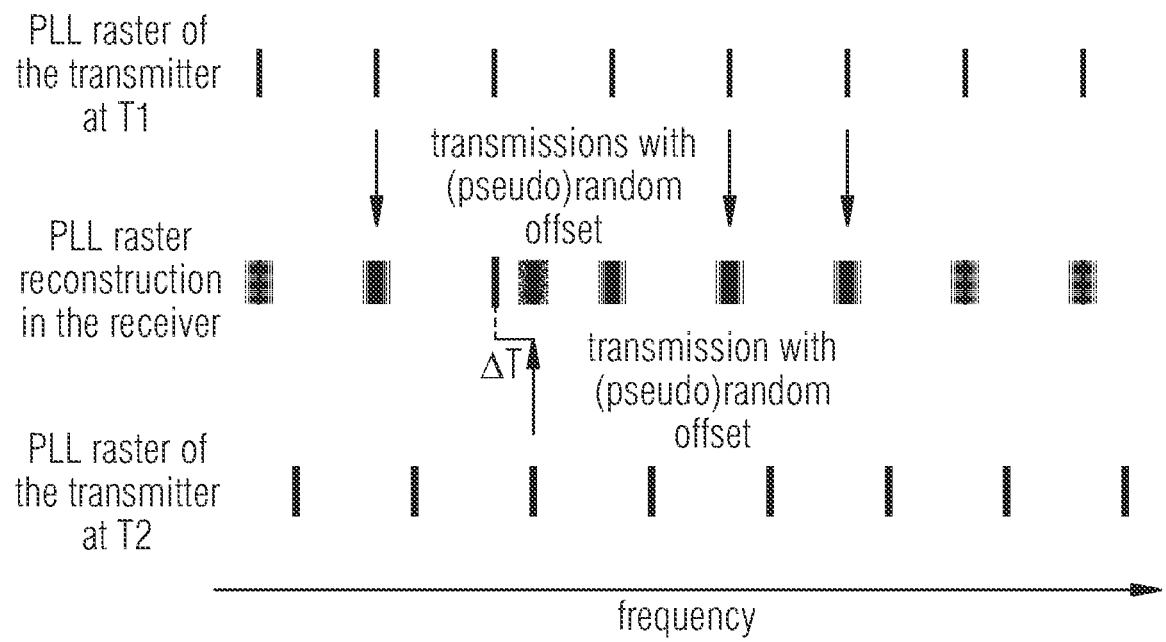
FIG. 7 is a schematic view of a PLL raster of the data transmitter at a first time at ambient temperature T1, the PLL raster of the data transmitter at a second time at ambient temperature T2 as well as a PLL raster for the reconstruction in the data receiver, wherein the transmissions are each performed with a (pseudo) random offset.

FIG. 7 shows a schematic view of a PLL raster 160_1 of the data transmitter 130 at a first time with ambient temperature T1, of the PLL raster 160_2 of the data transmitter 130 at a second time with ambient temperature T2 as well as of a PLL raster 162 for reconstruction in the data receiver 110, the transmissions each taking place with a (pseudo) random offset. Here, the abscissa describes the frequency. In other words, FIG. 7 shows a reconstruction of a difference temperature between emissions with random frequency offsets from the position of the PLL regulation point raster.

The artificial concealment should therefore take place downstream of the phase-locked loop and use as continuous a random space as possible. It is also possible to use the phase-locked loop for a coarse offset and to conceal the position of the regulation points by an additional, smaller random frequency shift.

In embodiments, the artificial offset on the data transmitter side can also lie between the discrete regulation points of the PLL raster by additional frequency shift to the reference clock.

In embodiments, the receiver on the data receiver side may have a larger reception width than the maximum reception offset resulting from a sum of quartz tolerances and signal bandwidth. An increased frequency search range in the receiver can be obtained by broader frequency estimation or multiple receiving channels.

In embodiments, the processed bandwidth in the receiver on the data receiver side can be at least 1.5 times greater than a sum of quartz tolerances and signal bandwidth, for example.

In embodiments, frequency synchronization by frequency hopping can be performed on the data receiver side in frequency hopping systems, e.g. by very fast phase tracking.

1.5 Changing (e.g. Deteriorating) the Estimation by Specific Phase Offsets

Similar to the tolerance width for frequency estimation, there is also a maximum tolerable phase offset for decoding. This is usually given by the type of modulation.

Figure 8:
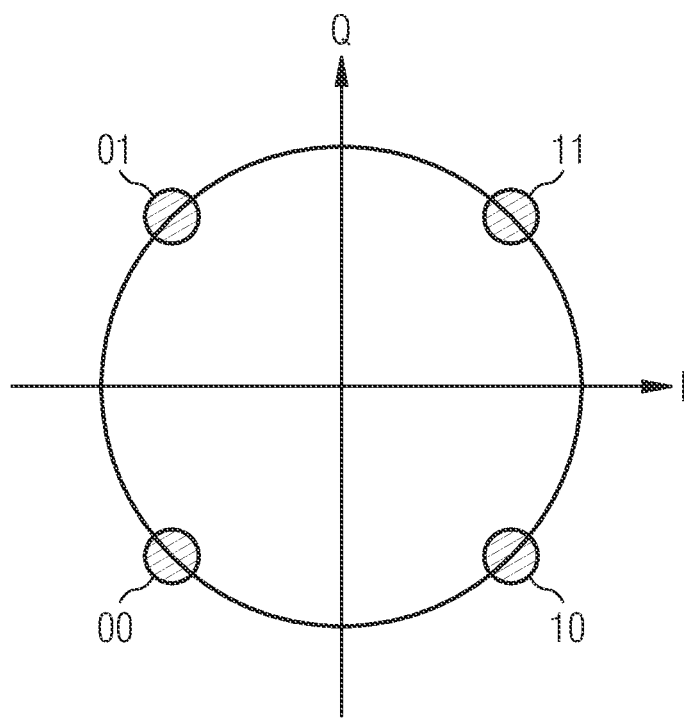
FIG. 8 is a constellation diagram of a π/4-Offset QPSK.

FIG. 8 shows a constellation diagram of a π/4-Offset QPSK [3].

The task of the receiver 116 of the data receiver 130 is, among other things, to recover the supposedly transmitted information from the received symbols. For this, after detection and synchronization, a decision is made as to which symbols were presumably transmitted in order to recover the information. This is done using the example of the QPSK shown in FIG. 8 by means of a decision in which quadrant the received symbols are located. If one moves on the unit circle, it can be determined that a phase offset of 45° is needed from the ideal constellation points to the boundary of the quadrants.

Thus, if the phase offset is below 45°, correct decoding is still possible. The transmission channel manipulates the phase in the receiver 116 by noise, fading and other effects. Under special conditions, however, it can be assumed that the maximum phase offset occurring through the channel is less than the maximum allowable value. This effect can be used for a deterioration of the receiving parameter estimations, since the estimation of the parameters takes place based on the received symbols.

If the maximum possible phase offset of the channel for all transmitted symbols is 25°, for example, 20° remains for artificial (random) phase offsets with the modulation shown in FIG. 8. It is important to note that not the same phase offset is added to all symbols, but that each symbol or symbol group has its own different phase offset. In the case that all symbols obtain the same offset, this corresponds to a carrier phase offset, which is available anyway and is estimated and possibly corrected by the receiver and attacker.

The deviation of the symbols from the expected constellation points deteriorates all estimation procedures based on a comparison with the ideal constellation points. These can be both so-called data-aided procedures and so-called non-data-aided procedures.

In embodiments, an artificial (random) phase offset can be applied to the symbols to be transmitted on the data transmitter side, wherein the phase offset for the symbols is different.

Typically, the carrier phase is estimated based on known pilot symbols, wherein for each pilot symbol the phase offset to the expected constellation point is calculated and then an averaging across all symbols is performed. Thus, by applying the artificial (random) phase offsets, the estimation of the carrier phase is also deteriorated.

To avoid deteriorating this estimate, it is possible to select the sum of all artificial (random) phase offsets over the averaging length (usually the length of the pilot sequence) so that the same is close to zero. With a remaining offset of zero after averaging, the effect would be completely compensated.

In embodiments, on the data transmitter side, the sum of the artificial (random) phase offsets over the averaging length can be selected such that the same converges towards zero.

1.6 Change (e.g. Deterioration) of the Transmitting Power

In embodiments, the transmitting power can be changed randomly, e.g. to reduce the influence of an environmental parameter on the transmitting power.

For example, the transmitting power can be changed randomly so that the attacker does not know if the window is open or not. Power control would also help.

1.7 Selection of the Artificial (Random) Offset

In the embodiments described above, an artificial (random) offset was used to conceal the individual signal characteristics. This offset is applied, for example, to the signal 120 and thus the actual signal characteristics are concealed.

In the following, examples of the selection of this artificial (random) offset will be described. The following examples all refer to the addition of a frequency offset, wherein these methods apply analogously to the other signal characteristics to be concealed.

1.7.1 Concealing at Constant Environmental Conditions

If it can be assumed that the environmental conditions at the data transmitter 130 are constant (e.g. if the data transmitter 130 has been deployed in an air-conditioned data center), the aim is to permanently obscure this constant value.

This can be achieved by a simple constant (once randomly determined) offset. If, for example, an average-free random process were used instead, which, for example, provides a new value for each new emission, the attacker could determine the actual environmental conditions again by averaging several emissions.

In embodiments, on the data transmitter side, the artificial (random) offset can be constant and cannot be varied over time.

1.7.2 Concealing in the Case of Rapidly Changing Environmental Conditions at the Data Transmitter This case is the exact opposite of the previous case, wherein the environmental conditions change so quickly that for (almost) every emission there are different environmental conditions at the data transmitter 130.

In this case, the attacker is interested in the changes between the emissions. With a data transmitter 130 in an apartment or a house, for example, it can be inferred from the environmental conditions whether someone is in the apartment or not.

In this case, the addition of a constant offset would not achieve concealment, as the changes would still be measurable. Here, a rapidly changing (random) process has to be selected here, which provides a different offset for (almost) every emission.

The rate of change should be selected just sufficient for the effects to be concealed. An unnecessarily frequent change of the offset provides an attacker with additional sampling points that can be used for stochastic averaging. In other words, ideally, the rate of change of the offset is adapted to the actual rate of change of the influences to be concealed.

In embodiments, on the data transmitter side, the artificial (random) offset can change with (almost) every emission and is therefore time-variant.

In embodiments, on the data transmitter side, the artificial (random) offset can follow a known distribution, e.g. a Gaussian distribution µ, σ.

In embodiments, on the data transmitter side, the parameters of the distribution can also be scrambled.

In embodiments, on the data transmitter side, the artificial (random) offset can be generated as a sum of many distributions.

1.7.3 Concealment with Slowly Changing Environmental Conditions at the Data Transmitter Normally, this case is the typical case for a data transmitter 130. The same describes the scenarios in which the environmental conditions at the data transmitter 130 change, but not so quickly that the environmental conditions are different (uncorrelated) for each (partial package) emission. In other words, the environmental conditions remain constant for a certain number of emissions.

Here, it is not mandatory that the environmental conditions change after the same number of emissions (i.e. regularly). Thus, there may also be a temporal variance in the change of the environmental conditions at the data transmitter 130.

In order to analyze this optimization problem more closely, first, constant ambient conditions are assumed, whereby the reception frequency of the signal at the data receiver 1100 does not change. A random process is assumed for concealment, which delivers a new frequency offset within the allowable range for each emission. As an attack, averaging across n emissions is carried out. For the attacker to extract as little information on the environmental conditions at the transmitter as possible by averaging, the result of the averaging should contain as much uncertainty as possible. In other words, the greatest possible variance is desired on the result of averaging.

For example, as described in Section 1.7.2, an offset changing at (almost) every emission can be used. Thus, the attacker has the possibility to extract the "true" offset by an average attack, when the value to be concealed remains constant across the averaging length.

In order to analyze this phenomenon more closely, an example of frequency offset concealment was simulated. An equally distributed random process with a width of +−2 kHz was used. This means that a frequency offset in the range −2 kHz to 2 kHz is randomly scrambled prior to each emission. This frequency offset was modulated to the transmitting signal. The environmental conditions were assumed to be constant over the duration of the averaging.

Figure 9:
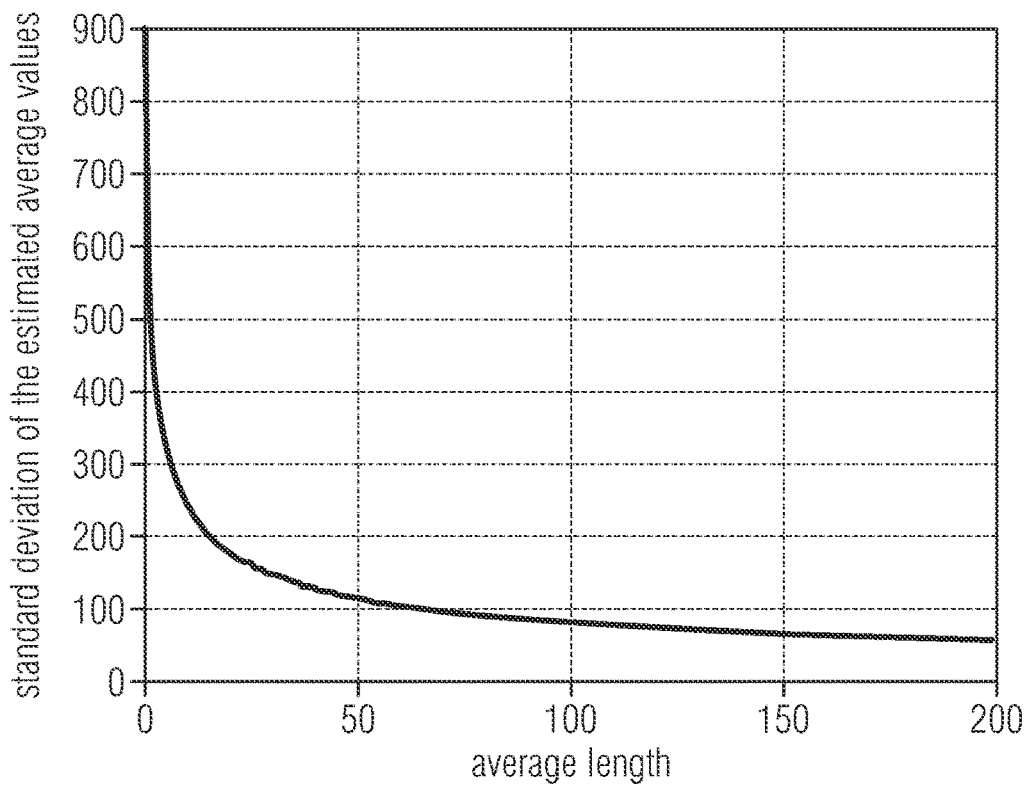
FIG. 9 shows, in a diagram, a standard deviation of the frequency offset estimation plotted over the averaging length in the receiver/attacker when applying a random equally distributed offset of ±2 kHz to each emission.

FIG. 9 shows in a diagram a standard deviation of the frequency offset estimation plotted over the averaging length in the receiver/attacker with a random equally distributed offset of ±2 kHz applied to each emission. The ordinate describes the standard deviation of the frequency offset estimation, while the abscissa describes the averaging length.

In other words, FIG. 9 shows the standard deviation of the averaging results in the receiver/attacker when using the above mentioned random process. In other words, in the receiver/attacker, an averaging of the emissions is performed over the length indicated on the x-axis and thus an average value is determined. This process is repeated several times and then the standard deviation is calculated across all determined average values. The standard deviation, like the variance, gives a measure of the estimation accuracy (and thus indirectly of the quality of the concealment). FIG. 9 assumes an ideal frequency estimation in the receiver/ attacker, but this is not critical as the deviation of the frequency estimation is generally much smaller than the value to be concealed.

As can be seen from FIG. 9, for the random process, the frequency offset of the receiver can be so well concealed under the parameters given above up to an averaging length of approximately five values that the uncertainty in an attack would still be too great to perform a targeted attack.

Conversely, however, this means that the protection only functions well up to a length of five values and that the environmental conditions at the data transmitter 130 therefore have to change at the latest every five values.

The second possibility for concealment would be a constant offset on all transmissions, as mentioned in section 1.7.1. However, this is not practicable, as it only ensures concealment of the absolute value and not the changes.

A combination of two offsets (random processes) can be used to conceal both attack possibilities (absolute value and change) over longer averaging lengths than in FIG. 9. It is important that the update rates of the two offsets (random processes) are of different lengths. In order to have a good concealment against changes, it makes sense to vary an offset with each emission. For example, the other offset can change every 50 emissions as assumed in FIG. 10. Furthermore, in FIG. 10 the variation width of the random processes was limited to ±1 kHz in comparison with FIG. 9 with only one random process. In total, this again results in a maximum combined offset of ±2 kHz for both processes. Both scenarios are therefore comparable.

Figure 10:
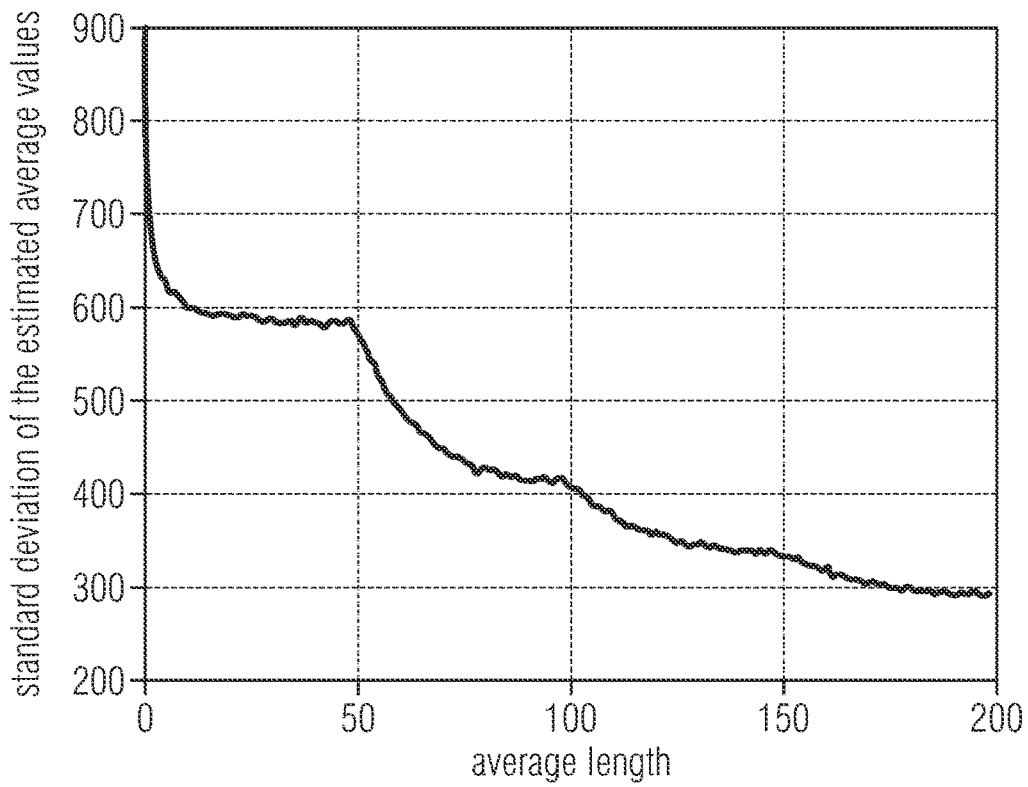
FIG. 10 shows, in a diagram, a standard deviation of the frequency offset estimation plotted over the averaging length in the receiver/attacking when applying two random equally distributed offsets of ±1 kHz to each emission, wherein the first process provides a new offset for each emission and the second offset changes every 50 emissions.

In detail, FIG. 10 shows in a diagram a standard deviation of the frequency offset estimation plotted over the averaging length in the receiver/attacker by applying two random equally distributed offsets of ±1 kHz to each emission, with the first process providing a new offset for each emission and the second offset changing every 50 emissions. The ordinate describes the standard deviation of the frequency offset estimation, while the abscissa describes the averaging length.

In the same way as FIG. 9, FIG. 10 shows the fast decrease of the standard deviation for short averaging lengths. However, in contrast to the scenario with only one offset, which changes with each emission, the standard deviation initially tends towards a constant value, which is significantly higher than the curve with only one offset for the same averaging lengths.

If more emissions are averaged than the update rate of the second process, the standard deviation drops rapidly.

Figure 11:
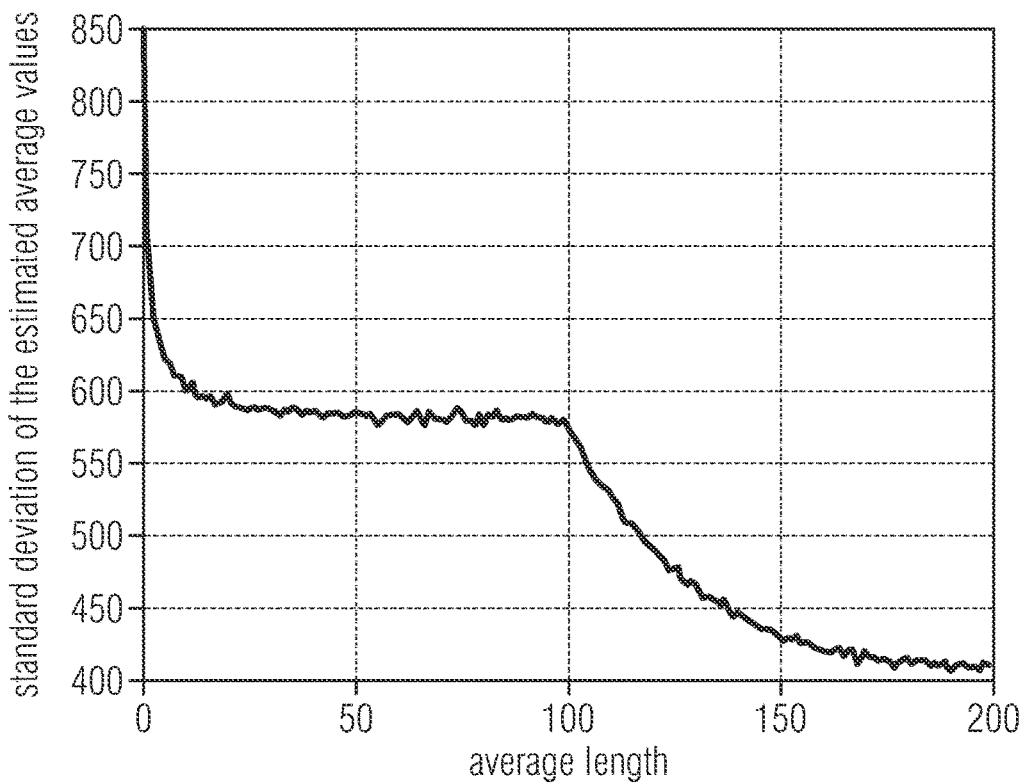
FIG. 11 shows, in a diagram, a standard deviation of the frequency offset estimation plotted over the averaging length in the receiver/attacker when applying two random equally distributed offsets of ±1 kHz to each emission, wherein the first process provides a new offset and the second offset changes every 100 emissions.

By extending the update rate of the second random process to e.g. 100 emissions, the approximation of the standard deviation towards the asymptote can be further extended, as can be seen in FIG. 11.

In detail, FIG. 11 shows in a diagram a standard deviation of the frequency offset estimation plotted over the averaging length in the receiver/attacker by applying two random equally distributed offsets of ±1 kHz to each emission, with the first process providing a new offset for and the second offset changing every 100 emissions. The ordinate describes the standard deviation of the frequency offset estimation, while the abscissa describes the averaging length.

In embodiments, the artificial (random) offset applied to the signal may have two separate offsets (e.g. random numbers), with the update rates of the two offsets differing (typically one of the two offsets has a larger update rate).

It is not mandatory, as assumed above, that the second (slowly changing) offset is constant for a certain time (update rate). Any time-varying function can be used for the offset. For example, the second offset can be represented by a sine function or a triangle function. In this case there is only an update rate for the first offset and a mapping function for the second offset, which is given, for example, by the frequency of the sine oscillation.

Figure 12:
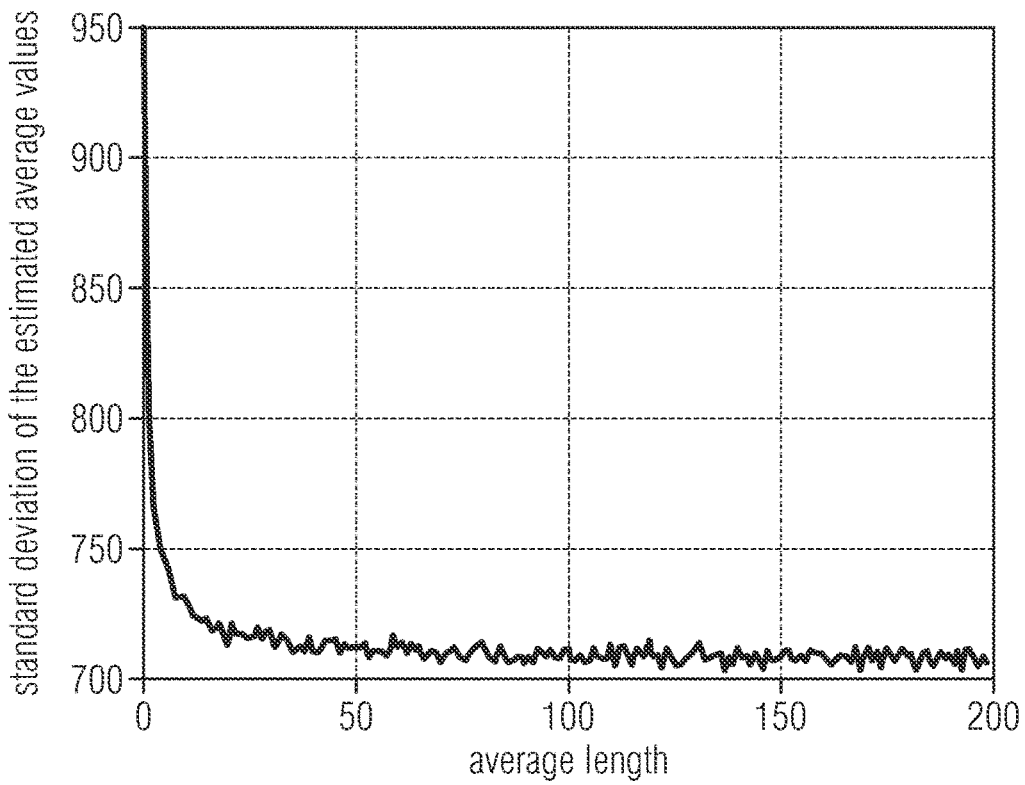
FIG. 12 shows, in a diagram, a standard deviation of the frequency offset estimation plotted over the averaging length in the receiver/attacker when applying two offsets of ±1 kHz to each emission, wherein the first process provides a new offset for each emission and a second offset consists of a sinus curve having the nominal frequency $\omega=0.25$.

This case is illustrated graphically in FIG. 12. For reasons of comparability, the variation widths of the two offsets were again selected with ±1 kHz, which in total results in a maximum deviation of ±2 kHz.

In detail, FIG. 12 shows in a diagram a standard deviation of the frequency offset estimation plotted over the averaging length in the receiver/attacker with two offsets of ±1 kHz applied to each emission, the first process providing a new offset for each emission and the second offset consisting of a sine curve with the nominal frequency $\omega=0.25$. The frequency offset estimation is plotted over the averaging length in the receiver/attacker with two offsets of ±1 kHz applied to each transmission. The ordinate describes the standard deviation of the frequency offset estimation, while the abscissa describes the averaging length.

As can be seen in FIG. 12, the curve approaches asymptotically against a value resulting from the variation widths of the two offsets. Even for long averaging lengths, the standard deviation is still so large that it is not possible to draw sufficiently accurate conclusions on the environmental conditions.

In embodiments, the second artificial offset can consist of a time-varying function (e.g. a sine function). The total offset results from the superposition of the two (random) offsets.

2. Receiver-Side Determination of Environmental Parameters of a Data Transmitter FIG. 13 shows a schematic block diagram of a system 100 having a data transmitter 130 and a data receiver 110 according to an embodiment of the present invention.

The data receiver 110 is configured to receive a signal 120 of the data transmitter 130, wherein the signal 120 depends on a clock signal 132 of a clock generator 134 (e.g., a frequency generator such as an oscillator or quartz) of the data transmitter 130. Further, the data receiver 110 is configured to determine (e.g., evaluate) a signal parameter 112 (e.g., a signal characteristic, such as a carrier frequency or carrier frequency deviation) of the signal 120 and to determine (e.g., to estimate), based on the signal parameter 112, an environmental parameter 114 (e.g., a temperature or temperature change) to which the clock generator 134 of the data transmitter 110 and/or the signal 120 is exposed.

Figure 13:
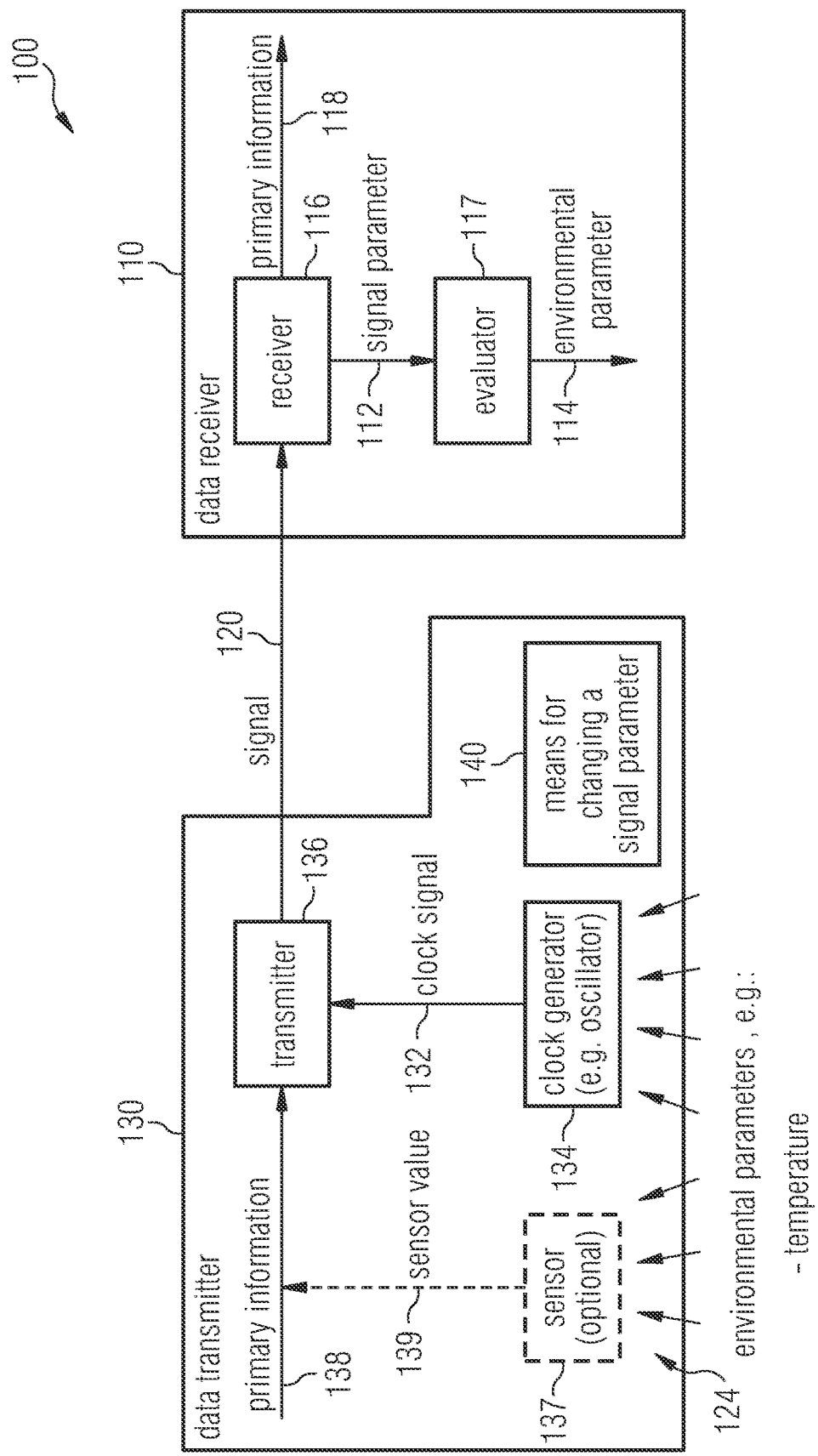
FIG. 13 is a schematic block diagram of a system having a data transmitter and a data receiver according to an embodiment of the present invention.

As shown exemplarily in FIG. 13, the data transmitter 130 can comprise a transmitter 136 (radio chip/front end) that is configured to generate the signal 120 (transmitting signal), wherein the signal 120 depends on the clock signal 132 of the clock generator 134. For example, the transmitter 136 can be clocked with the clock signal 132 of the clock generator 134 such that the signal 120 depends on the clock signal 132 of the clock generator 134.

An environmental parameter 124 (e.g., a temperature or temperature change) acting on the clock generator 134 of the data transmitter 130 influences the clock generator 134 and hence at least one signal parameter (e.g., frequency) of the clock signal 132 provided by the clock generator 134. Since the signal 120 transmitted by the data transmitter 130 depends on the clock signal 132, the environmental parameter 124 does not only influence a signal parameter (e.g., frequency) of the clock signal 132, but also a signal parameter (e.g., a signal characteristic, such as carrier frequency) of the signal 120 transmitted by the data transmitter 130.

Thus, by evaluating the signal parameter 112 of the received signal 120, the data receiver 110 can draw conclusions on the environmental parameter (e.g., temperature) in the environment of the data transmitter 130 or estimate the same.

Here, the signal parameter 112 is independent of a modulation content of the signal 120, such as modulated primary information comprised by the signal 120.

For example, the data transmitter 130 (or the transmitter 136 of the data transmitter 130) can be configured to modulate primary information 138 (e.g., an ID (identifier) of the data transmitter 130, a synchronization sequence/pilot sequence, payload data and/or dummy data) such that the signal 120 comprises modulated primary information. However, apart from the modulated primary information, the signal 120 additionally includes information on the environmental parameter 124 (in the environment of the data transmitter 130) in the signal parameter 112, which the data receiver 130 can evaluate to draw conclusions on the environmental parameter 114.

As shown exemplarily in FIG. 13, the data receiver 110 can comprise a receiver 116 that is configured to demodulate the received signal 120 in order to obtain the primary information 118 contained in the signal 120. Further, the data receiver 110 (e.g., the receiver 116 of the data receiver 110) can be configured to determine or evaluate the signal parameter 112 of the received signal 120 in order to obtain the information on the environmental parameter 124 additionally contained in the signal 120. For this, the data receiver 110 can, for example, comprise an evaluator 117 (e.g., a processor) that is configured to determine (e.g., to estimate) the environmental parameter 113 based on the signal parameter 112, for example based on a mapping function mapping the signal parameter 112 on the environmental parameter 114.

In embodiments, the data transmitter 130 (or the transmitter 136 of the data transmitter 130) can be configured to provide, as a signal 120, a digitally modulated signal 120. Here, the data receiver 110 can be configured to determine an analog signal parameter 112 (e.g., an analog signal characteristic, such as a carrier frequency) of the digitally modulated signal 120, and to determine the environmental parameter 114 based on the analog signal parameter 112. Here, the analog signal parameter 112 is independent of a modulation content of the digitally modulated signal 120, such as from digitally modulated primary information comprised by the signal 120.

Thus, in embodiments, it is possible to estimate the environmental parameter in the environment of the data transmitter 130 based on the (analog) signal parameter 112, without having to explicitly transmit the environmental parameter in the modulation content of the signal 120, i.e., in the modulated primary information of the signal 120.

Thus, although primarily completely different payload data or also even only an ID of the data transmitter and/or a synchronization sequence/pilot sequence are transmitted with the signal 120, it is still possible to determine the environmental parameter in the environment of the data transmitter 130 based on the (analog) signal parameter 112.

Determining the environmental parameter in the environment of the data transmitter 130 based on the (analog) signal parameter of the received signal 120 provides a broad spectrum of application options.

In that way, according to embodiments, the data transmitter 130 can comprise a sensor 137 for an environmental parameter 124 as indicated exemplarily in FIG. 13. Since the environmental parameter on the side of the data receiver 110 can also be determined based on the (analog) signal parameter 112 of the signal 120, it is no longer needed to transmit the sensor value 139 regularly or with every emission of the signal 120 in the modulated primary information of the signal 120. Rather, it is sufficient to transmit, together with the signal 120 as modulated primary information, a synchronization sequence/pilot sequence and/or an ID of the data transmitter 130 or also only dummy data. Thereby, the amount of data transmitted with the signal 120 can be reduced, whereby also the energy needed for transmission of the signal 120 can be reduced, which is particularly advantageous for battery-operated data transmitters 130. Also, the sensor 137 no longer has to be activated for each emission of the signal 120, which can reduce energy consumption further. Obviously, the sensor value 139 provided by the sensor 137 can additionally be transmitted in an emission or a low number (subset) of emissions of the signal 120 in the modulated primary information and used on the side of the data receiver 110, for example for calibration or initialization. In the same way, it is possible to completely omit the sensor 137 for the environmental parameter on the side of the data transmitter and/or to determine the environmental parameter on the side of the data receiver 110 exclusively based on the determined signal parameter 112 of the received signal 120.

Further, by determining the environmental parameter on the side of the data receiver 110 based on the (analog) signal parameter 112 of the signal 120, it is possible to use a data transmitter 130 comprising a sensor 137 for a first environmental parameter also as a sensor for a second environmental parameter. For example, according to embodiments, the data transmitter 130 can comprise a sensor 137 for a first environmental parameter 124 (e.g., humidity or pressure), wherein the data receiver 110 is configured to determine a second environmental parameter (e.g., temperature) based on the determined signal parameter 112 of the signal 120, wherein the first environmental parameter and the second environmental parameter differ from each other.

Further, by determining the environmental parameter on the side of the data receiver 110 based on the (analog) signal parameter 112 of the received signal 120, it is possible to use a data sensor 130 having no sensor for the environmental parameter as a sensor for an environmental parameter.

Above that, it is possible to use an existing data transmitter 130 as sensor for an environmental parameter (e.g., as temperature sensor) although the data transmitter 130 is actually not intended as sensor for the environmental parameter, for example since the data transmitter 130 has no sensor for the environmental parameter or also since the data transmitter 130 cannot transmit the sensor value.

Optionally, the data transmitter 130 and the data receiver 110 can be configured to transmit or receive data 120 by using the telegram splitting method. Here, a telegram or data packet is split into a plurality of subdata packets (or partial data packets or partial packets) and the subdata packets transmitted from the data transmitter 130 to the data receiver 110 distributed in time according to a hopping pattern and/or distributed in frequency, wherein the data receiver 110 merges (or combines) the subdata packets again in order to obtain the data packet. Here, each of the subdata packets includes only part of the data packet. Further, the data packet can be channel-coded such that not all subdata packets but only part of the subdata packet is needed for error-free decoding of the data packet. Temporal distribution of the plurality of subdata packets can take place according to a time and/or frequency shift pattern.

Since the environmental parameter 124 in the environment of the data transmitter 130 cannot only be determined (e.g., estimated) by the data receiver 110 based on a signal parameter, but theoretically also by any other data receiver which can potentially be an attacker, the data transmitter 130 includes, as already described herein in detail, means 140.

Thus, in embodiments, the data transmitter 130 comprises the means 140 for changing (e.g. modifying, corrupting, concealing or deteriorating) a signal parameter (see also FIG. 4) that is configured to change (e.g. modify, conceal, corrupt or deteriorate) at least one signal parameter (e.g. modulation index, symbol rate, transmitting time, carrier frequency, phase) of the signal 120 or a parameter (e.g. clock signal 132) on which the signal parameter of the signal 120 depends.

In order that the data receiver 110 may nevertheless determine the environmental parameter 124 in the environment of the data transmitter 130 based on the at least one signal parameter, the data receiver 110 may be configured in embodiments to compensate the data transmitter-side change of the signal parameter prior to estimating the signal parameter or the environmental parameter.

In embodiments, the data receiver 110 may know the data transmitter-side change of the signal parameter (e.g. the offset applied to the data transmitter-side signal parameter).

In embodiments, the data receiver can be configured to derive the data transmitter-side change in the signal parameter (e.g., the offset with which the signal parameter is provided on the data transmitter side) from an immanent parameter of the communication system of the data receiver or from a message transmitted with the signal.

In embodiments, the data receiver can be configured to derive the data transmitter-side change of the signal parameter (e.g., the offset with which the signal parameter is provided on the data transmitter side) from a cryptographic key known to the data transmitter and the data receiver.

In the following, further embodiments of the data receiver 110 and/or data transmitter 130 will be described in more detail.

2.1 Deduct Known Influences

Some systems use pseudo-random deviations, for example in the frequency and/or time domain. This would lead to wrong results when estimating the environmental parameters (e.g., temperature estimation). Normally, the pseudo-random deviations follow a known pattern. If this pseudo-random offset determined by scrambling (or the rule how the same is determined) is known to the data receiver 130 (e.g., the base station), this value can be deducted from the receiving parameter before conversion into the environmental parameter takes place.

In embodiments, known artificially added changes of the signal parameters (receiving parameters) can be subtracted, such as a pseudo-random deviation of the transmitting times or the frequency offsets.

Further, intentional concealments as described above can be deducted. Here, the estimation of the receiving parameters functions exactly in the same way as if these concealments were not applied. However, the prerequisite is that the receiver knows the values of the concealment.

In embodiments, hardware-specific errors, which are added, for example by the transmitting hardware of the node, can be subtracted (e.g., deducted).

In embodiments, data transmitter-specific (e.g., node specific) data can be stored in the data receiver 110 (e.g., base station).

In embodiments, the intentional changes of the signal parameters can be transformed in the modulated primary information, i.e., in the payload data of the signal 120 or by means of an intrinsic parameter and can be extracted on the side of the data receiver 110 from the modulated primary information (e.g., clear text, CRC, CMAC).

Frequently, frequency hopping is used in emissions in order to obtain an improved interference resistance. Thus, the data transmitter 130 transmits on different carrier frequencies. If the data receiver 110 does not know the carrier frequencies of the respective emission in advance, the data receiver 110 can determine, for example, based on an estimation, in what sub-channel the transmission has taken place. If the channel distance between the sub-channels is greater than the maximum quartz defect, this can be obtained by a modulo operation.

For calculating the frequency difference by considering the desired channel, in embodiments, the desired channel can be determined. For this, the frequency can be divided by the channel bandwidth with the modulo operation. A prerequisite for this is that the channel distance is greater than the quartz defect.

For calculating the frequency difference by considering the PLL resolution step, in embodiments, the PLL resolution step can subtracted. For this, the frequency can be divided by the PLL step width with the modulo operation.

For calculating the time difference by considering a time error caused by the transmitter (e.g., transmitting chip) in the data transmitter 130, in embodiments, the time can also be modulo calculated, e.g., on symbol duration or subdata packet duration or telegram duration or timer resolution, wherein the residual of the division yields the desired time error.

For increasing the resolution of the frequency estimation, typically, multi-stage synchronization is used, here, the transmitted data are estimated by means of (partial) decoding. Subsequently, the same can be used for improved frequency estimation by means of re-encoding.

In embodiments, a method with improved frequency estimation accuracy can be used. For example, decoded bits can be encoded again and the phase/frequency (based on the re-encoded bits) can be estimated more accurately.

3. Further Embodiments

Figure 14:
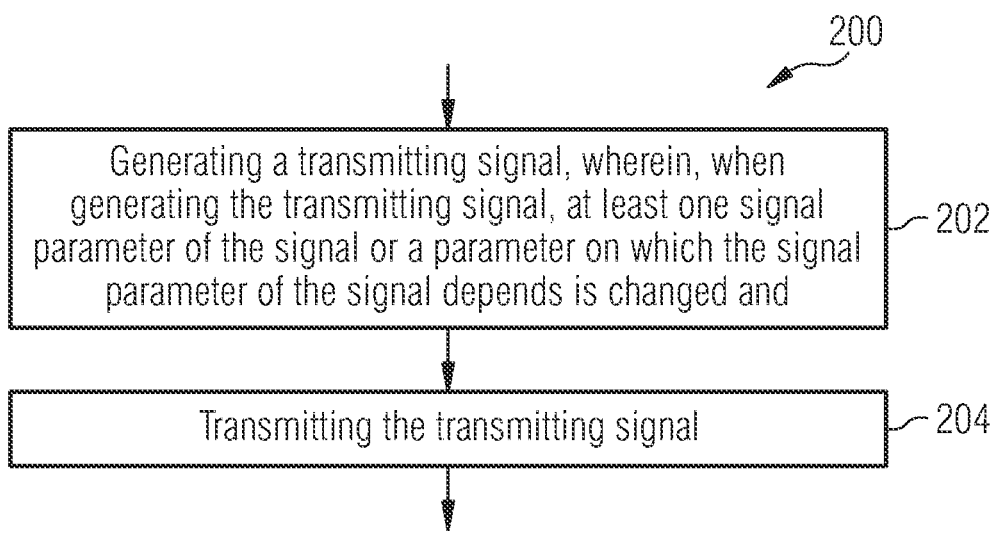
FIG. 14 is a flow diagram of a method for transmitting a signal according to an embodiment of the present invention.

FIG. 14 shows a flow chart of a method 200 for transmitting a signal according to an embodiment of the present invention. The method 200 comprises a step 202 of generating a transmitting signal, wherein when generating the transmitting signal at least one signal parameter (e.g. modulation index, symbol rate, transmitting time, carrier frequency, phase) of the signal or a parameter (e.g. clock signal), on which the signal parameter of the signal depends, is changed. Further, the method 200 comprises a step 204 of transmitting the transmitting signal.

Figure 15:
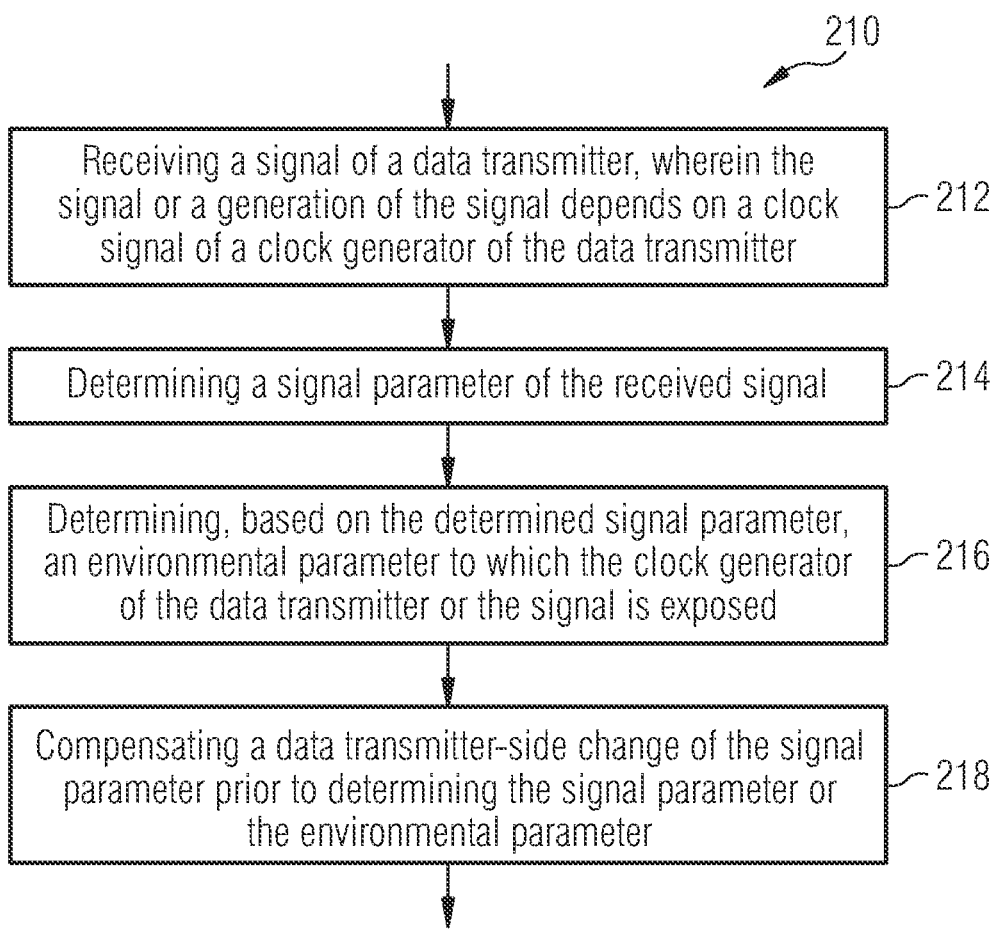
FIG. 15 is a flow diagram of a method for determining an environmental parameter in the environment of a data transmitter according to an embodiment of the present invention.

FIG. 15 shows a flow diagram of a method 210 for determining an environmental parameter in the environment of a data transmitter according to an embodiment of the present invention. The method 210 includes a step 212 of receiving a signal of a data transmitter, wherein the signal or a generation of the signal depends on a clock signal of a clock generator (e.g., a frequency generator, such as oscillator or quartz) of the data transmitter. Further, the method 210 includes a step 214 of determining (e.g., estimating) a signal parameter (e.g., a signal characteristic) of the received signal. Further, the method 210 includes a step 216 of determining an environmental parameter (e.g., a temperature or temperature change) to which the clock generator of the data transmitter or the signal is exposed, based on the determined signal parameter. Further, the method 210 includes a step 218 of compensating a data transmitter-side change of the signal parameter prior to determining the signal parameter or the environmental parameter.

As already indicated, in embodiments, data can be transmitted between the data transmitter and the data receiver by using the telegram splitting method. Here, a telegram or data packet is divided into a plurality of subdata packets (or partial data packets or partial packets) and the subdata packets are transmitted discontiguously from the data transmitter to the data receiver, e.g., distributed over time and/or in the frequency according to a hopping pattern, wherein the data receiver merges (or combines) the subdata packets again in order to obtain the data packet. Here, each of the subdata packets includes only part of the data packet. Further, the data packet can be channel coded, such that not all subdata packets but only part of the subdata packets is needed for error-free decoding of the data packet. The temporal distribution of the plurality of subdata packets can take place according to a time and/or frequency hopping pattern.

Further embodiments provide a data receiver, wherein the data receiver is configured to receive a signal of a data transmitter, wherein the signal or generation of the signal depends on a clock signal of a clock generator (e.g., a frequency generator, such as oscillator or quartz) of the data transmitter, wherein the data receiver is configured to determine (e.g., evaluate) a signal parameter (e.g., a signal characteristic) of the signal and to determine (e.g., to estimate), based on the signal parameter an environmental parameter (e.g., a temperature or temperature change) to which the clock generator of the data transmitter or the signal is exposed.

In embodiments, the signal parameter can be independent of a modulation content of the signal.

In embodiments, the signal can be a digitally modulated signal, wherein the data receiver can be configured to determine an analog signal parameter (e.g., an analog signal characteristic) of the digitally modulated signal.

For example, the signal parameter can be independent of a modulation content of the digitally modulated signal.

In embodiments, the data receiver can be configured to use known symbols (e.g., pilot symbols) in the signal for determining the signal parameter.

In embodiments, the known symbols can be divided into groups, wherein the groups of symbols can be at different locations of the signal (e.g., at the beginning and the end).

In embodiments, the data receiver can be configured to use at least four known symbols, advantageously 20 known symbols and more advantageously 40 known symbols for determining the signal parameter.

In embodiments, the signal can comprise a plurality of subdata packets, wherein the known symbols are distributed across several subdata packets.

In embodiments, the data receiver can be configured to use no known symbols for determining the signal parameter.

In embodiments, the signal can comprise, apart from modulated primary information (e.g., an ID of the data transmitter, a synchronization sequence, payload data and/or dummy data) information on the environmental parameter in the signal parameter.

In embodiments, the signal can be emitted at specific time intervals (e.g., equal or unequal time intervals), wherein emission of the signal or a real subset of the emissions of the signal can additionally comprise information on the environmental parameter (e.g., a sensorially determined version of the environmental parameter) in the modulated primary information, wherein the data receiver can be configured to calibrate the determination (e.g., estimation or derivation) of the environmental parameter based on the signal parameter based on the information on the environmental parameter included in the modulated primary information.

For example, the data receiver can be configured to receive the signal in a plurality of time periods of the sequence of time periods, wherein the signal received in a first subset of time periods of the sequence of time periods additionally comprises information on the environmental parameter (e.g., a sensorially determined version of the environmental parameter) in the modulated primary information, wherein the data receiver is configured to calibrate the determination (e.g., estimation or derivation) of the environmental parameter based on the signal parameter based on the information on the environmental parameter included in the modulated primary information, wherein the signal received in a second subset of time periods of the sequence of time periods includes no information on the environmental parameter in the modulated primary information, wherein the first subset of time periods and the second subset of time periods are disjoint.

In embodiments, the modulated primary information may not include information on the environmental parameter.

In embodiments, the data receiver can be configured to determine the environmental parameter from the signal parameter based on a mapping function.

In embodiments, the mapping function can be known to the data receiver.

In embodiments, the data receiver can be configured to calibrate the mapping function based on at least one piece of information on the environmental parameter determined by a sensor.

In embodiments, the data receiver can be configured to determine the mapping function based on at least two pieces of information on the environmental parameter determined by a sensor.

In embodiments, the data receiver can be configured to determine the mapping function based on a polynomial approximation in dependency on the at least two pieces of information on the environmental parameter determined by the sensor.

In embodiments, the data receiver can be configured to select the mapping function from a set of mapping functions based on at least one piece of information on the environmental parameter determined by a sensor.

In embodiments, the data receiver can be configured to determine an average value and dispersion across at least two pieces of information on the environmental parameter determined by the sensor, wherein the data receiver can be configured to select the mapping function from the set of mapping functions based on the average value and the dispersion.

In embodiments, the signal can be emitted at specific time intervals (e.g., equal or unequal time intervals), wherein at least one emission of the signal or a real subset of the emissions of the signal (e.g., in the modulated primary information) comprises the at least one piece of information on the environmental parameter determined by the sensor.

In embodiments, the mapping function can be a temperature profile of the clock generator of the data transmitter.

In embodiments, the signal can be emitted at specific time intervals (e.g., equal or unequal time intervals), wherein the data receiver can be configured to determine at least two signal parameters based on at least two emissions of the signal, wherein the data receiver can be configured to determine the environmental parameter based on the at least two signal parameters.

In embodiments, the data receiver can be configured to combine the at least two signal parameters (e.g., by subtraction) in order to obtain a combined signal parameter, wherein the data receiver can be configured to determine the environmental parameter based on the combined signal parameter.

In embodiments, the data receiver can be configured to determine at least two signal parameters (e.g., frequency and modulation error) of the signal, wherein the data receiver can be configured to determine (e.g., to estimate), based on the at least two signal parameters, one environmental parameter (e.g., a temperature or temperature change) each to which the clock generator of the data transmitter or the signal is exposed.

For example, based on the at least two signal parameters, the data receiver can determine equal environmental parameters (e.g., temperatures or temperature differences) or different environmental parameters (e.g., temperature in pressure or a temperature difference and pressure difference).

In embodiments, the data receiver can be configured to combine the determined environmental parameters (e.g., by averaging) in order to obtain a combined environmental parameter.

In embodiments, the signal or a generation of the signal can further depend on a further clock signal of a further clock generator (e.g., frequency generator and timer) of the data transmitter, wherein the data receiver can be configured to determine two signal parameters of the signal and to determine the environmental parameter based on the two signal parameters.

In embodiments, the signal can be emitted at specific time intervals (e.g., equal or unequal time intervals), wherein at least one emission of the signal or a real subset of the emissions of the signal (e.g., in the modulated primary information) comprises information on a deviation of the two clock generators of the data transmitter, wherein the data receiver can be configured to calibrate the determination of the environmental parameter based on the deviation of the two clock generators of the data transmitter.

For example, the deviation of the two clock generators of the data transmitter can indicate the current difference of the frequencies of the two clock generators. For example, the two clock generators (e.g., quartzes) can be measured with respect to one another in order to determine a value (e.g., in ppm, such as 20 ppm), which indicates by how much the two clock generators diverge. The value can be transmitted as well. The data receiver (e.g., base station) can estimate the time (receiving time) and frequency (receiving frequency) and the information in order to determine/calibrate the quartz temperature profiles of the time quartz or the frequency quartz at the node.

In embodiments, the data receiver can be configured to receive a further signal from a further data transmitter, wherein the further signal or a generation of the further signal depends on a clock signal of a clock generator of the further data transmitter, wherein the data transmitter and the further data transmitter are essentially exposed to the same environmental parameter (e.g., are arranged in the same room), wherein the data receiver can be configured to determine a further signal parameter of the further signal and to determine the environmental parameter based on the signal parameter and the further signal parameter.

In embodiments, the data receiver can be configured to combine the signal parameter and the further signal parameter to obtain a combined signal parameter and to determine the environmental parameter based on the combined signal parameter.

In embodiments, the signal parameter and the further signal parameter can individually allow the determination of a relative environmental parameter (e.g., temperature changes), wherein the data receiver can be configured to determine an absolute environmental parameter based on the signal parameter and the further signal parameter in combination.

In embodiments, the data transmitter and the further data transmitter can belong to different radio systems (e.g., can be data transmitters of different radio systems).

In embodiments, the clock signal of the clock generator can depend on the environmental parameter.

In embodiments, the data receiver can be configured to compensate an age-related influence of the clock generator on the signal parameter.

For example, the data receiver can know the age-related influence of the clock generator on the signal parameter. Further or alternatively, the data receiver can be configured to determine or estimate the age-related influence of the clock generator on the signal parameter, e.g., based on at least two subsequent received signals of the data transmitter.

In embodiments, the data receiver can be configured to compensate an exemplary dispersion-related influence of the clock generator on the signal parameter.

In embodiments, the signal parameter can be
a receiving carrier frequency,
a receiving time,
a receiving symbol rate,
a receiving modulation index,
a Doppler frequency
a signal-to-noise ratio,
a signal power,
a channel phase,
a channel attenuation,
a channel dispersion and/or
a polarization rotation,
or a change of the same.

In embodiments, the environmental parameter can be
a temperature,
a humidity,
an atmospheric pressure,
an electromagnetic radiation,
a brightness,
a movement and/or
a vibration
or a change of the same.

Further embodiments provide a system having a data receiver according to one of the embodiments described herein and a data transmitter, wherein the data transmitter can be configured to transmit the signal, wherein the signal or the generation of the signal depends on the clock signal of the clock generator of the data transmitter.

In embodiments, the data transmitter can be configured to transmit the signal at specific time intervals (e.g., equal or unequal time intervals), wherein the data transmitter can be configured to provide at least one emission of the signal or a real subset of the emissions of the signal with information on the environmental parameter determined by a sensor.

Further embodiments provide a method. The method includes a step of receiving a signal of a data transmitter, wherein the signal or a generation of the signal depends on a clock signal of a clock generator (e.g., a frequency generator, such as oscillator or quartz) of the data transmitter. Further, the method includes a step of determining (e.g., estimating) a signal parameter (e.g., a signal characteristic) of the received signal. Further, the method includes a step of determining, based on the determined signal parameter, an environmental parameter (e.g., a temperature or temperature change) to which the clock generator of the data transmitter or the signal is exposed.

In embodiments, the influence of the environment on the clock generator of the data transmitter can be by a factor of at least two or by a factor of four greater than an influence of the environment on a clock generator of a data receiver that receives the signal of the data transmitter.

In embodiments, the influence of the environment on a clock generator of a data receiver receiving the signal of the data transmitter can be by the factor of at least two or by the factor of four greater than an influence of the environment on the clock generator of the data transmitter.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier.

In other words, an embodiment of the inventive method is, therefore, a computer program comprising a program code for performing one of the methods described herein, when the computer program runs on a computer.

A further embodiment of the inventive method is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

The apparatuses described herein may be implemented, for example, by using a hardware apparatus or by using a computer or by using a combination of a hardware apparatus and a computer.

The apparatuses described herein or any components of the apparatuses described herein may be implemented at least partly in hardware and/or software (computer program).

The methods described herein may be implemented, for example, by using a hardware apparatus or by using a computer or by using a combination of a hardware apparatus and a computer.

The methods described herein or any components of the methods described herein may be performed at least partly by hardware and/or by software (computer program).

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] https://de.wikipedia.org/wiki/Schwingquarz
[2] https://www.nxp.com/docs/en/application-note/AN3251.pdf
[3] https://de.wikipedia.org/wiki/Quadraturphasenumtastung#/media/File:QPSK_Gray_Coded.svg
[4] http://eur-lex.europa.eu/legal-content/DE/TXT/PDF/?uri=uriserv:OJ.L_.2016.119.01.0001.01.DEU
[5] https://www.sii.co.jp/en/quartz/circuit-design/

The invention claimed is:

1. A data transmitter, comprising:
a clock generator configured to provide a clock signal;
a transmitter configured to transmit a transmit signal, wherein the transmitter is configured to generate the transmit signal using the clock signal, and wherein at least one environmental parameter of an environment of the data transmitter that is acting on the clock generator influences the clock signal provided by the clock generator and therewith also at least one signal parameter of the transmit signal, such that the at least one signal parameter depends on the at least one environmental parameter,
a changer device configured to change the at least one signal parameter, wherein the changer device is configured to additionally change the at least one signal parameter of the transmit signal,
wherein the changer device is configured to provide the at least one signal parameter with an offset to change the at least one signal parameter.

2. Data transmitter according to claim 1,
wherein the at least one signal parameter is at least two signal parameters,
wherein the changer device is configured to provide the at least two signal parameters with an offset each to change the at least two signal parameters.

3. Data transmitter according to claim 1,
wherein the offset is a constant offset and/or a time-varying offset.

4. Data transmitter according to claim 1,
wherein the offset is a random or pseudo-random offset.

5. Data transmitter according to claim 1,
wherein the offset comprises two offset components changing differently over time.

6. Data transmitter according to claim 5,
wherein the offset comprises two offset components,
wherein a first offset component of the two offset components is based on a time-varying function,
and wherein a second offset component of the two offset components is based on a random or pseudo-random process.

7. Data transmitter according to claim 1,
wherein the offset comprises two offset components,
wherein a first offset component of the two offset components is a constant offset component, and wherein a second offset component of the two offset components is a time-varying offset component.

8. Data transmitter according to claim 1,
wherein the data transmitter is configured to derive the offset from an immanent parameter of a communication system of the data transmitter or a message to be transmitted with the transmit signal.

9. Data transmitter according to claim 1,
wherein the data transmitter is configured to transmit encrypted information on the offset with the transmit signal or a further transmit signal.

10. Data transmitter according to claim 1,
wherein the data transmitter is configured to derive the offset from a cryptographic key or pair of keys known to the data transmitter and a data receiver.

11. Data transmitter according to claim 1,
wherein the data transmitter is configured to provide the signal parameter with a correction factor depending on the environmental parameter in the environment of the data transmitter to acquire a corrected signal parameter, wherein the changer device is configured to change the corrected signal parameter.

12. Data transmitter according to claim 1,
wherein the signal parameter is a modulation index or a change of the same,
wherein the offset is a modulation index offset.

13. Data transmitter according to claim 12,
wherein the modulation index offset is average-free across an averaging length.

14. Data transmitter according to claim 12,
wherein the modulation index offset is adapted in dependence on an accumulated modulation index offset depending on a bit sequence to be transmitted.

15. Data transmitter according to claim 1,
wherein the signal parameter is a symbol rate or a change of the same,
wherein the offset is a symbol rate offset.

16. Data transmitter according to claim 1,
wherein the signal parameter is a transmitting time or a change of the same,
wherein the offset is a time offset.

17. Data transmitter according to claim 16,
wherein an intermission between two subsequent emissions of the transmit signal is less than an estimation accuracy in symbol durations divided by a double maximum quartz tolerance.

18. Data transmitter according to claim 1,
wherein the signal parameter is a carrier frequency or a change of the same,
wherein the offset is a frequency offset.

19. Data transmitter according to claim 18,
wherein the changer device is configured to provide the carrier frequency with a random frequency offset.

20. Data transmitter according to claim 18,
wherein the changer device is configured to select the frequency offset in dependence on a maximum possible offset of a clock generator of the data transmitter and a receiver-side search range.

21. Data transmitter according to claim 18,
wherein the data transmitter is configured to provide the carrier frequency with a correction factor depending on the environmental parameter in the environment of the data transmitter in order to correct an influence of the environmental parameter on the carrier frequency,
wherein the changer device is configured to select the frequency offset in dependence on a receiver-side search range and the correction factor.

22. Data transmitter according to claim 18,
wherein the data transmitter is configured to transmit the transmit signal based on frequency hopping using a plurality of carrier frequencies,
wherein the changer device is configured to provide at least two of the plurality of carrier frequencies with different frequency offsets.

23. Data transmitter according to claim 22,
wherein the frequency offsets are smaller than a receiver-side tolerance width of a detection.

24. Data transmitter according to claim 23,
wherein the tolerance width is less than ¼ of the symbol rate.

25. Data transmitter according to claim 18,
wherein at least one of the frequency offsets lies between discrete regulation points of a PLL raster of a clock generator of the data transmitter or multiples thereof.

26. Data transmitter according to claim 18,
wherein the transmit signal comprises encrypted information on the different frequency offsets.

27. Data transmitter according to claim 18,
wherein the data transmitter is configured to determine the different frequency offsets based on an immanent parameter of a communication system of the data transmitter or based on a part of the message to be transmitted with the signal.

28. Data transmitter according to claim 1,
wherein the signal parameter is a phase or a change of the same,
wherein the offset is a phase offset.

29. Data transmitter according to claim 28,
wherein the changer device is configured to provide at least two symbols of the transmit signal with different phase offsets.

30. Data transmitter according to claim 28,
wherein the phase offsets are selected so that they converge towards zero across an averaging length.

31. Data transmitter according to claim 1,
wherein the signal parameter is a transmitting power or a change of the same,
wherein the offset is a transmitting power offset.

32. Data transmitter according to claim 1,
wherein the environmental parameter is
a temperature,
a humidity,
an atmospheric pressure,
an electromagnetic radiation,
a brightness,
a movement and/or
a vibration
or a change of the same.

33. Data transmitter according to claim 1,
wherein the data transmitter is configured to adapt the change of the signal parameter in dependence on installation conditions.

34. Data transmitter according to claim 33,
wherein the data transmitter is configured to determine the installation conditions based on a received signal strength indication, RSSI, measurement.

35. Data transmitter according to claim 1,
wherein the data transmitter is configured to adaptively adapt the change of the signal parameter in dependence on a telegram length or sub-data packet length or a number of coded bits.

36. Data transmitter according to claim 1,
wherein the data transmitter is configured to provide two signal parameters of the signal with offsets, wherein the offsets of the two signal parameters at least partly compensate each other.

37. Data transmitter according to claim 1,
wherein the data transmitter knows receiving limits of a data receiver receiving the transmit signal,
wherein the data transmitter is configured to change the signal parameter taking into account the receiving limits.

38. System, comprising:
a data transmitter according to claim 1, and
a data receiver, wherein the data receiver is configured to receive a signal, wherein at least one signal parameter of the signal is changed.

39. A data receiver,
wherein the data receiver is configured to receive a transmit signal of a data transmitter, wherein a generation of the transmit signal depends on a clock signal of a clock generator of the data transmitter, wherein at least one environmental parameter of an environment of the data transmitter that is acting on the clock generator of the data transmitter influences the clock signal provided by the clock generator and therewith also at least one signal parameter of the transmit signal, such that the at least one signal parameter of the transmit signal depends on the environmental parameter wherein the signal parameter is additionally changed at the data transmitter-side by a changer device of the data transmitter that provides the at least one signal parameter with an offset to change the at least one signal parameter,
wherein the data receiver is configured to determine the signal parameter of the transmit signal and to determine, based on the signal parameter, an environmental parameter to which the clock generator of the data transmitter or the signal is exposed,
wherein the data transmitter is configured to compensate the data transmitter-side additional change of the signal parameter prior to estimating the signal parameter or the environmental parameter.

40. Data receiver according to claim 39,
wherein the data receiver knows the data transmitter-side change of the signal parameter.

41. Data receiver according to claim 39,
wherein the data receiver is configured to derive the data transmitter-side change of the signal parameter from an immanent parameter of the communication system of the data receiver or a message transmitted with the transmit signal.

42. Data receiver according to claim 39,
wherein the data receiver is configured to derive the transmitter-side change of the signal parameter from a cryptographic key or pair of keys known to the data transmitter and the data receiver.

43. System, comprising:
a data transmitter according to claim 1, and
a data receiver,
wherein the data receiver is configured to receive a transmit signal of a data transmitter, wherein the transmit signal or a generation of the transmit signal depends on a clock signal of a clock generator of the data transmitter,
wherein the data receiver is configured to determine a signal parameter of the transmit signal and to determine, based on the signal parameter, an environmental parameter to which the clock generator of the data transmitter or the transmit signal is exposed,
wherein the data transmitter is configured to compensate a data transmitter-side change of the signal parameter prior to estimating the signal parameter or the environmental parameter,
or a data receiver,
wherein the data receiver is configured to receive a transmit signal of a data transmitter, wherein the transmit signal or a generation of the transmit signal depends on a clock signal of a clock generator of the data transmitter,
wherein the data receiver is implemented to compensate an additional tolerance caused by a data transmitter-side change of at least one signal parameter of the transmit signal.

44. A data receiver,
wherein the data receiver is configured to receive a transmit signal of a data transmitter, wherein the a generation of the transmit signal depends on a clock signal of a clock generator of the data transmitter, wherein at least one environmental parameter of an environment of the data transmitter that is acting on the clock generator of the data transmitter influences the clock signal provided by the clock generator and therewith also at least one signal parameter of the transmit signal, such that the at least one signal parameter of the transmit signal depends on the environmental parameter, wherein the signal parameter is additionally subject to a data transmitter-side change of the least one signal parameter of the signal by a changer device of the data transmitter that provides the at least one signal parameter with an offset to change the at least one signal parameter, wherein the data receiver is implemented to compensate the additional tolerance caused by the data transmitter-side change of the at least one signal parameter of the transmit signal.

45. Data receiver according to claim 44,
wherein the data receiver knows the data transmitter-side change of the signal parameter.

46. Data receiver according to claim 44,
wherein the data receiver is configured to derive the data transmitter-side change of the signal parameter from an immanent parameter of the communication system of the data receiver or a message transmitted with the transmit signal.

47. Data receiver according to claim 44,
wherein the data receiver is configured to derive the transmitter-side change of the signal parameter from a cryptographic key or pair of keys known to the data transmitter and the data receiver.

48. A method for transmitting a signal, the method comprising:

generating a transmit signal with a data transmitter, wherein the transmit signal is generated using a clock signal of a clock generator of the data transmitter, and wherein at least one environmental parameter of an environment of the data transmitter that is acting on the clock generator influences the clock signal provided by the clock generator and therewith also at least one signal parameter of the transmit signal, such that the at least one signal parameter of the transmit signal depends on the at least one environmental parameter in an environment of the data transmitter, wherein, when generating the transmit signal, the at least one signal parameter of the transmit signal is additionally changed using a changer device of the data transmitter, wherein the changer device provides the at least one signal parameter with an offset to change the at least one signal parameter, and transmitting the transmit signal.

49. A method for receiving a transmit signal, the method comprising:

receiving a transmit signal of a data transmitter, wherein the transmit signal is generated using a clock signal of a clock generator of the data transmitter, and wherein at least one environmental parameter of an environment of the data transmitter that is acting on the clock generator influences the clock signal provided by the clock generator and therewith also at least one signal parameter of the transmit signal, so that the at least one signal parameter of the transmit signal depends on the environmental parameter, wherein, when generating the transmit signal, the at least one signal parameter of the transmit signal is additionally changed using a changer device of the data transmitter, wherein the changer device provides the at least one signal parameter with an offset to change the at least one signal parameter, determining the signal parameter of the received transmit signal, determining, based on the determined signal parameter, the environmental parameter to which the clock generator of the data transmitter or the transmit signal is exposed, and compensating a data transmitter-side additional change of the signal parameter prior to determining the signal parameter or the environmental parameter.

50. A non-transitory digital storage medium having a computer program stored thereon to perform the method, comprising:

generating a transmit signal with a data transmitter, wherein the transmit signal is generated using a clock signal of a clock generator of the data transmitter, and wherein at least one environmental parameter of an environment of the data transmitter that is acting on the clock generator influences the clock signal provided by the clock generator and therewith also at least one signal parameter of the transmit signal, such that the at least one signal parameter of the transmit signal depends on the at least one environmental parameter in an environment of the data transmitter, wherein, when generating the transmit signal, the at least one signal parameter of the transmit signal is additionally changed using a changer device of the data transmitter, wherein the changer device provides the at least one signal parameter with an offset to change the at least one signal parameter, and transmitting the transmit signal, when said computer program is run by a computer.

51. A non-transitory digital storage medium having a computer program stored thereon to perform the method, comprising:

receiving a transmit signal of a data transmitter, wherein the transmit signal is generated using a clock signal of a clock generator of the data transmitter, and wherein at least one environmental parameter of an environment of the data transmitter that is acting on the clock generator influences the clock signal provided by the clock generator and therewith also at least one signal parameter of the transmit signal, so that the at least one signal parameter of the transmit signal depends on the environmental parameter, wherein, when generating the transmit signal, the at least one signal parameter of the transmit signal is additionally changed using a changer device of the data transmitter, wherein the changer device provides the at least one signal parameter with an offset to change the at least one signal parameter, determining the signal parameter of the received transmit signal, determining, based on the determined signal parameter, the environmental parameter to which the clock generator of the data transmitter or the transmit signal is exposed, and compensating a data transmitter-side additional change of the signal parameter prior to determining the signal parameter or the environmental parameter, when said computer program is run by a computer.

* * * * *